United States Patent
Jones

(10) Patent No.: US 11,833,576 B2
(45) Date of Patent: Dec. 5, 2023

(54) RIVETING METHOD

(71) Applicant: Atlas Copco IAS UK Limited, Flintshire (GB)

(72) Inventor: Elliot Jones, Flintshire (GB)

(73) Assignee: Atlas Copco IAS UK Limited, Flintshire (GB)

( * ) Notice: Subject to any disclaimer, the term of this patent is extended or adjusted under 35 U.S.C. 154(b) by 0 days.

(21) Appl. No.: 17/265,615

(22) PCT Filed: Aug. 5, 2019

(86) PCT No.: PCT/GB2019/052191
§ 371 (c)(1),
(2) Date: Feb. 3, 2021

(87) PCT Pub. No.: WO2020/025981
PCT Pub. Date: Feb. 6, 2020

(65) Prior Publication Data
US 2021/0299737 A1    Sep. 30, 2021

(30) Foreign Application Priority Data
Aug. 3, 2018 (GB) ..................................... 1812641

(51) Int. Cl.
*B21J 15/02* (2006.01)
*F16B 19/08* (2006.01)
*F16B 19/10* (2006.01)

(52) U.S. Cl.
CPC ........... *B21J 15/025* (2013.01); *F16B 19/086* (2013.01); *F16B 19/08* (2013.01); *F16B 19/1027* (2013.01)

(58) Field of Classification Search
CPC ........ F16B 19/08; F16B 19/086; B21J 15/025
See application file for complete search history.

(56) References Cited

U.S. PATENT DOCUMENTS 2,397,111 A * 3/1946 Huck ..................... B21J 15/045
29/512
2,451,356 A * 10/1948 Rechton ................... B21J 15/04
411/501

(Continued)

FOREIGN PATENT DOCUMENTS

| CN | 101982252 A | 3/2011 |
| CN | 102248112 A | 11/2011 |

(Continued)

OTHER PUBLICATIONS

JP-5673469-B2 machine translation (Year: 2015).*

(Continued)

*Primary Examiner* — Michael W Hotchkiss
(74) *Attorney, Agent, or Firm* — Michael Best & Friedrich LLP

(57) ABSTRACT

A method of riveting comprising providing a rivet having a head and a shank depending downwardly therefrom, the shank terminating in a tip and being hollow so as to define a rivet interior, receiving an insert at least partially within the rivet interior, placing the rivet and insert on the opposite side of a workpiece from a die, driving the rivet and the insert towards the die and into the workpiece under the action of a force using a punch along a central axis, and reacting the force using the die so as to cause the rivet to flare outwardly and interlock the workpiece.

16 Claims, 14 Drawing Sheets

(56) References Cited

U.S. PATENT DOCUMENTS

| | | | | |
|---|---|---|---|---|
| 2,925,748 A * | 2/1960 | Ross | | B21J 15/02 173/127 |
| 3,030,850 A * | 4/1962 | Minor | | B21J 15/04 403/368 |
| 3,065,661 A * | 11/1962 | Kolec | | F16B 19/008 411/41 |
| 3,432,925 A * | 3/1969 | Woolley | | B21J 15/046 29/745 |
| 3,995,406 A * | 12/1976 | Rosman | | B21J 15/02 29/524.1 |
| 4,223,433 A * | 9/1980 | Rosman | | B21J 15/02 29/524.1 |
| 4,633,560 A * | 1/1987 | Muller | | F16B 37/065 72/464 |
| 4,825,527 A * | 5/1989 | Ladouceur | | F16B 37/065 29/512 |
| 4,897,004 A * | 1/1990 | Norton | | B21J 15/045 29/525.07 |
| 5,540,528 A * | 7/1996 | Schmidt | | F16B 19/1081 24/297 |
| 5,651,172 A * | 7/1997 | Auriol | | B21J 15/02 29/512 |
| 5,733,086 A * | 3/1998 | Jakob | | B21J 15/02 411/501 |
| 6,962,469 B2 * | 11/2005 | Wang | | F16B 5/04 411/501 |
| 6,988,862 B1 * | 1/2006 | Iguchi | | F16B 19/1027 411/501 |
| 7,179,032 B2 * | 2/2007 | Guy | | F16B 2/08 248/74.2 |
| 7,955,035 B2 * | 6/2011 | Singh | | F16B 19/05 411/361 |
| 8,087,149 B2 * | 1/2012 | Wang | | B21J 15/08 411/501 |
| 8,721,241 B2 * | 5/2014 | Jokisch | | F16B 5/04 411/29 |
| 8,727,688 B2 * | 5/2014 | Auriol | | F16B 19/1027 411/501 |
| 9,255,597 B2 * | 2/2016 | Marxkors | | B21J 15/147 |
| 10,012,257 B2 * | 7/2018 | Capko | | F16B 37/067 |
| 10,252,317 B2 * | 4/2019 | Babej | | B23P 19/062 |
| 11,105,360 B2 * | 8/2021 | Campbell | | B21J 15/147 |
| 2003/0175095 A1 * | 9/2003 | Clarke | | B21J 15/025 411/501 |
| 2004/0107557 A1 * | 6/2004 | Morris | | F16B 19/086 29/798 |
| 2004/0223832 A1 * | 11/2004 | Aasgaard | | F16B 19/1054 411/501 |
| 2006/0159545 A1 * | 7/2006 | Humpert | | F16B 37/064 411/181 |
| 2006/0236739 A1 * | 10/2006 | Smith | | B21C 37/298 72/67 |
| 2007/0104553 A1 * | 5/2007 | Philipskotter | | F16B 19/086 411/176 |
| 2008/0038077 A1 * | 2/2008 | Aasgaard | | F16B 19/083 411/29 |
| 2010/0232906 A1 * | 9/2010 | Singh | | F16B 19/086 411/501 |
| 2013/0011212 A1 | 1/2013 | Auriol | | |
| 2014/0140785 A1 * | 5/2014 | Auriol | | F16B 5/04 411/44 |
| 2015/0056042 A1 * | 2/2015 | Marxkors | | B21J 15/025 227/62 |
| 2016/0201709 A1 * | 7/2016 | Li | | F16B 19/1027 411/34 |
| 2018/0094660 A1 * | 4/2018 | Mayer | | F16B 19/086 |
| 2019/0368527 A1 * | 12/2019 | Mahlme | | F16B 37/065 |

FOREIGN PATENT DOCUMENTS

| | | | | |
|---|---|---|---|---|
| CN | 104339651 A | | 2/2015 | |
| CN | 106102956 A | | 11/2016 | |
| CN | 107117123 A | | 9/2017 | |
| DE | 102011009602 A1 * | | 3/2012 | F16B 19/086 |
| DE | 102013214331 A1 * | | 1/2015 | F16B 19/008 |
| DE | 102013214331 A1 | | 1/2015 | |
| JP | 2002364617 A | | 12/2002 | |
| JP | 2009526179 A | | 7/2009 | |
| JP | 2013015161 A | | 1/2013 | |
| JP | 2013068233 A | | 4/2013 | |
| JP | 5673469 B2 * | | 2/2015 | B21J 15/025 |
| JP | 5791980 B2 * | | 10/2015 | B21J 15/025 |
| JP | 2015175459 A | | 10/2015 | |
| KR | 20180076183 A | | 7/2018 | |
| WO | 2007132194 A1 | | 11/2007 | |
| WO | 2012063022 A2 | | 5/2012 | |
| WO | 2012063023 A2 | | 5/2012 | |

OTHER PUBLICATIONS

JP-5791980-B2 machine translation (Year: 2015).*
DE-102011009602-A1 Machine Translation (Year: 2012).*
DE-102013214331-A1 Translation (Year: 2013).*
International Search Report and Written Opinion for Application No. PCT/GB2019/052191 dated Dec. 12, 2019 (14 pages).
United Kingdom Intellectual Property Office Search Report for Application No. GB1812641.7 dated Jan. 14, 2019 (4 pages).
International Preliminary Report on Patentability for Application No. PCT/GB2019/052191 dated Feb. 9, 2021 (10 pages).
Chinese Patent Office Action for Related Application No. 201980065640.1 dated Sep. 22, 2022 (18 pages Including an English translation).
Japanese Patent Office Reason of Rejection for Application No. 2021505677 dated Apr. 4, 2023 (14 pages).

* cited by examiner

RIVETING METHOD

RELATED APPLICATION DATA

This application is a U.S. National phase application of International Application No. PCT/GB2019/052191 filed Aug. 5, 2019, which claims priority to Application No. GB 1812641.7 filed Aug. 3, 2018, the entire contents of all of which are herein incorporated by reference herein.

The present invention relates to a method of riveting and in particular to a method of riveting using a self-piercing rivet and an insert.

Self-piercing rivets are used to join one or more layers of material by forming a mechanical interlock. Such rivets typically comprise a head and a partially hollow shank. During use, the layers of material to be joined are laid on top of one another and placed above a die. The rivet is driven into the materials from a side opposite the die under the action of a setting apparatus such as a rivet setter. Often, the die and setting apparatus will be joined together via a C-shaped frame and are provided as a single unit (although this is not always necessary). The geometry of the die is such that it is able to resist the force of the setting apparatus in a direction normal to the layers of material whilst encouraging outward flaring of the rivet shank. When the rivet shank flares, the tip of the rivet acts to compress the layers of material against the rivet head, so as to form a mechanical interlock which prevents separation of the rivet and the layers of material. Preferably, forming of the joint is finished when the rivet head is flush with the upper layer of material. Using self-piercing rivets in a joining process reduces the number of production steps as compared to conventional riveting in which a hole first has to be drilled into the sheet material before the rivet is inserted and then its projecting ends upset.

Self-piercing rivets can be used to join a variety of materials. For example, self-piercing rivets, often in combination with adhesive, have been used to great commercial success in the automobile industry for joining lightweight and highly ductile materials such as aluminium for car body panels. Recently it has become desirable to manufacture such panels from stronger materials such as steel. It may be desirable to insert rivets into workpieces which include advanced high strength steel (AHSS), which may have tensile strength in excess of 550 MPa, and/or into workpieces which include ultra-high strength steel (UHSS), which may have a tensile strength of at least 800 MPa. However, due to the increased strength of the material being joined it is necessary to use a stronger rivet to ensure that the rivet is able to penetrate AHSS or UHSS. It has been found that whilst it is possible to provide a rivet of adequate strength to penetrate AHSS or UHSS, the reduced ductility of such a rivet and the materials being joined results in limited flaring of the rivet. As a result of the limited flaring of the rivet, a strong interlock between the rivet and the workpiece is not achieved. In addition, extremely high stresses may be generated in both the rivet and the materials being joined. Such high stresses may result in cracking of the rivet or the materials being joined. This weakens the structural stability of the joint and leaves the joint vulnerable to corrosion by water ingress. It is therefore desirable to provide an improved process for joining of high-strength and low-ductility materials such as AHSS and UHSS.

It is an object of the present invention to obviate or mitigate the disadvantages of self-piercing riveting for high strength materials which are present in the prior art, whether identified above or elsewhere. It is a further object of the invention to provide an alternative process for self-piercing riveting.

SUMMARY

According to a first aspect of the invention there is provided a method of riveting comprising providing a rivet having a head and a shank depending downwardly therefrom, the shank terminating in a tip and being hollow so as to define a rivet interior, receiving an insert at least partially within the rivet interior, placing the rivet and insert on the opposite side of a workpiece from a die, driving the rivet and the insert towards the die and into the workpiece under the action of a force using a punch along a central axis, and reacting the force using the die so as to cause the rivet to flare outwardly and interlock the workpiece.

When the rivet and the insert are driven into the workpiece against the die, the insert provides the rivet with additional strength. This is particularly advantageous in applications where the workpiece comprises an ultra-high strength material such as UHSS. It will be appreciated that when the workpiece is made from an ultra-high strength material, in order to pierce and/or penetrate the workpiece a rivet which is also composed of an ultra-high strength material may be used (although in some embodiments the additional strength provided by the insert will allow a softer rivet to be used). Typically however, such ultra-high strength materials exhibit relatively little ductility, and are therefore more difficult to deform to create a sound joint. However, due to the use of an insert received within a rivet interior, the method of the present invention is able to cause flaring of the rivet even with such ultra-high strength materials.

Where the rivet is composed of an ultra-high strength material, its natural resistance to deformation will cause it to attempt to return to an undeformed shape (for example due to its own elasticity). This natural resistance to deformation often leads to high internal stresses remaining in the rivet and workpiece materials within the formed joint, which is known to lead to the formation of cracks that may severely structurally weaken the joint and/or leave it vulnerable to corrosion. However, the presence of the insert within the formed joint is able to absorb some of the elastic compression of the rivet to support the rivet from the inside. This reduces the internal stresses which remain in the rivet and the workpiece after the joint is formed (i.e. the residual stress). As such, problems with crack formation can be avoided.

A further advantage of the invention is that because flaring of the rivet is caused or encouraged by the presence of the insert, no specially adapted tooling is required to perform the method, and therefore standard tooling may be used. This reduces set up costs. For example, because the flaring is caused by the insert, it is not necessary to provide a die having a central protrusion configured to encourage flaring, and thus simpler and cheaper die geometries can be used. Furthermore, because flaring is encouraged by the insert it is possible use a shallow die to join high or ultra-high strength materials (such as UHSS), low ductility materials (such as cast aluminium) or to join materials of increased thickness. Conversely, the presence of the insert is even able to encourage flaring of the rivet where the workpiece is so soft that the workpiece would not normally be able to provide sufficient resistance to cause the rivet to flare. It will be appreciated that the amount of flaring can be controlled by adjusting the geometry of the insert so as to ensure an adequate joint is provided, taking into account the properties of the materials being joined (for example by changing diameter of the insert, and/or providing angled surfaces which encourage flaring of the rivet).

The insert may comprise a tapered insert surface extending from a base of the insert. The tapered insert surface may vary in diameter relative to an insert axis. The method may comprise urging the rivet against the tapered insert surface so as to cause the tip of the rivet to flare outwardly and interlock the workpiece.

It will be appreciated that by "insert axis" it is meant a longitudinally extending central axis of the insert. In certain embodiments, the insert may be rotationally symmetrical about the insert axis. Furthermore, a "tapered surface" may be an external surface of the insert which is revolved about the insert axis, the diameter of which changes in the direction of the insert axis. The tapered insert surface may be an external surface of the insert. During use, the insert axis may be collinear with the central axis.

It will be appreciated that as the rivet is urged against the tapered insert surface, the tapered insert surface resists further movement of the rivet in the direction of the applied force, and deflects a component of the applied force radially outwards. However, because the tapered insert surface tapers outwardly (i.e. such that it varies in diameter relative to the insert axis) the tapered insert surface is able to direct the normal reaction of the applied force in a radially outwards direction in relation to the central axis. This encourages the rivet to flare and interlock the workpiece. This is particularly the case where the diameter of the tapered insert surface is greater closer to the workpiece. The tapered surface may be concave.

The rivet may comprise a shank having a tapered rivet surface extending towards the tip of the rivet, wherein the tapered rivet surface varies in diameter relative to a rivet axis. The method may comprises urging the tapered rivet surface against the tapered insert surface so as to cause the tip of the rivet to flare outwardly and interlock the workpiece.

The term "rivet axis" may be interpreted as meaning a longitudinally extending central axis of the rivet. In certain embodiments, the rivet may be substantially symmetrical about the rivet axis.

Because both the tapered insert surface and the tapered rivet surface vary in diameter, it will be appreciated that the resultant contact forces between the tapered insert surface and the tapered rivet surface can be controlled so as to be angled outwardly relative to the central axis. That is to say, a component of the force can be deflected based upon the relative geometries of the rivet and the insert, so as to force the tip of the rivet radially outwards and pierce the workpiece. As such, the tapered rivet surface works in conjunction with the tapered insert surface to encourage flaring of the rivet. This is particularly the case where the diameter of the tapered rivet surface is greater closer to the workpiece. Furthermore, flaring of the tip of the rivet may cause the tip to cut into the workpiece, so as to at least partially penetrate the workpiece in the direction of flaring. The tapered rivet surface may be convex.

The insert may comprise an insert shank configured to be received within the rivet interior. The method may comprises transferring the force from the punch to the workpiece through both the rivet and the insert shank.

It will be appreciated that by "insert shank" it is meant a generally cylindrical or tubular portion of the insert extending upwardly from the base. In certain embodiments, the insert shank may join the tapered insert surface. Due to the presence of the insert shank, when the rivet and the insert are driven into the workpiece, both the insert shank and the rivet shank act to transfer the force into the workpiece. That is to say, the presence of the insert shank within the rivet interior helps prevent the rivet from buckling before it is able to penetrate the workpiece, particularly in situations where the workpiece is composed of an ultra-high strength material. As such, the internal stresses experienced by the rivet and insert are reduced and therefore the rivet and insert can be composed of lower strength and more ductile materials.

The insert shank may be hollow so as to define an insert cavity. The method may comprise causing the insert cavity to collapse as the head of the rivet is brought flush with the top of the workpiece.

The insert cavity may be open at an end of the insert facing the head of the rivet when the insert is received within the rivet interior so as to define the insert cavity. When the internal stress experienced by the insert shank exceeds the yield strength of the insert material, the shank (and therefore the insert cavity) will collapse. This may promote flaring of the rivet.

The method may further comprise punching a hole entirely through the workpiece using the rivet and the insert so as to form a detached portion of the workpiece, and receiving the rivet and insert within the hole.

The punched hole may extend from an upper surface of the workpiece to a lower surface of the workpiece through substantially the entire thickness of the workpiece, irrespective of the number of layers of material that the workpiece comprises. That is to say, the punched hole is a through-hole extending through all layers of the workpiece. It will be appreciated that where the workpiece comprises multiple layers, multiple detached portions may be formed corresponding to the layers of the workpiece (such detached portions having been punched from the workpiece). The hole through the workpiece may taper outwardly. This allows the shank of the rivet to flare easily.

The die may comprises a bore and a push rod received within the bore, wherein the push rod is movable relative to the bore, the bore and the push rod defines a cavity which is open at a side of the die facing the punch. The method may further comprise reacting the force using the push rod and the detached portion of the workpiece so as to cause the rivet to flare outwardly and interlock the workpiece.

It will be appreciated that the detached portion of the workpiece, once separated, will fall into the bore defined by the die and rest upon the push rod. Continued application of the force urges the insert and rivet against an upper surface of the detached portion, which in turn urges the detached portion against the push rod. The push rod is held in position such that it resists the force, thus causing the rivet to flare.

The method may further comprise spacing the push rod from a lower surface of the workpiece by an amount equal to the thickness of the workpiece.

It will be appreciated that because the push rod is spaced from the workpiece by an amount equal to the thickness of the workpiece, when the detached portion has been punched from the workpiece an upper surface of the detached portion will be approximately level with the lower surface of the workpiece. As such, the tip of the rivet is prevented from protruding from the hole. However, only a relatively small amount of flaring is required in order to interlock the workpiece and therefore the workpiece is held in compression even though the tip of the rivet does not protrude beneath the workpiece. This is particularly advantageous where the hole formed in the workpiece is tapered.

The die may further comprise a sleeve surrounding the push rod, wherein the sleeve is movable relative to the push rod. The method may further comprise receiving the rivet within the hole such that the tip of the rivet is disposed beyond the bottom of the hole on the side of the die; and retracting the sleeve along the central axis relative to the push rod, so as to provide an annular cavity adjacent to the tip of the rivet to permit the rivet to flare and interlock the workpiece.

When the rivet and insert are driven into the workpiece, the sleeve may be positioned so that it is flush with the top of the die. As such, the internal diameter of the sleeve is preferably sized so as to correspond to the size of the hole to be punched (as measured at the bottom of the hole). The sleeve reacts the force transferred to the workpiece so as to delimit the circumference of the hole. Retracting the sleeve creates the annular cavity, providing space for the tip of the rivet to flare.

The method may comprise spacing the push rod from a lower surface of the workpiece by an amount greater than the thickness of the workpiece.

As such, when the rivet and insert are received in the hole, the tip of the rivet is able to protrude from the lower side of the workpiece. Because the tip protrudes from the workpiece, flaring of the rivet tip is able to hold the entire workpiece in compression, and requires relatively little flaring to form the interlock.

The rivet may comprises a through hole defining the rivet interior, and the punch may comprise an inner portion and an outer portion movable relative to one another along the central axis. The method may comprise applying the force to the rivet and insert by: urging the outer portion of the punch against the head of the rivet, passing the inner portion of the punch into the through hole of the rivet, and urging the inner portion of the punch against the insert.

It will be appreciated that by through hole it is meant that the rivet is substantially hollow such that it is open at its opposite ends. As such, the central portion of the punch is able to pass into the through hole and bear against the insert whilst the outer portion of the punch is urged against the head portion of the rivet. The force is therefore provided as two components, one of which is applied to the rivet and the other of which is applied to the insert. It will be appreciated that the loads applied to the rivet and insert via the outer and inner portion of the punch can be varied independently of one another using different drive mechanisms, so as to optimise joining of materials and geometries.

Furthermore, where the insert comprises an insert shank, it will be appreciated that the top of the shank may be axially spaced from the head of the rivet within the rivet interior. The difference in height between the top of the insert shank and the head of the rivet may be chosen so as to produce a desired amount of flaring of the tip of the rivet once the rivet has been driven into the workpiece such that the head of the rivet is flush with the insert shank.

The workpiece may comprise at least two separate layers of material to be joined; and wherein the method comprises, before the third step of the method, forming a hole in an upper layer of the workpiece.

Because a hole is formed in the upper layer before the rivet and insert are driven into the workpiece, the force required to drive the rivet and insert into the workpiece is lowered. This is particularly advantageous where the upper layer of material is an ultra-high strength material and the remaining layers are relatively lower strength. In such situations, the rivet and insert do not need to withstand such high loads to penetrate the workpiece, and therefore the rivet and/or insert may be made from a lower strength material exhibiting improved ductility. As such, residual stresses remaining in the joint after forming may be lowered, and therefore problems with cracking are avoided. It will be appreciated that the hole may be formed in substantially any suitable manner, such as for example by drilling, punching or the like.

The method may comprise forming the hole in the upper layer by urging the punch against the upper layer to form a detached portion of the upper layer.

Because the hole in the upper layer hole is formed by the punch, no additional machinery or tooling is required to form the hole.

The punch may comprise a tapered nose. The method may comprise urging the nose of the punch against the upper layer of the workpiece so as to punch the hole in the upper layer.

It will be appreciated that the size of the hole created be the punch in the upper layer of the workpiece will depend upon the size of the nose of the punch. Typically, the diameter of the punch will be relatively large in comparison to the desired size of the hole. As such, the diameter of the nose of the punch is smaller than the diameter of the remainder of the punch. In one embodiment of the invention, this is achieved by simply providing a lower portion of the punch having the desired diameter. However, such a step change in diameters of the punch is likely to lead to areas of relatively high internal stresses in the punch itself which may shorten the fatigue life of the punch. By providing a punch with a tapered nose, such stress concentrations are avoided and thus the fatigue life of the punch is increased. Furthermore, the shape of the tapered nose prevents the punch becoming stuck within the formed hole. In some embodiments of the invention, the nose may be replaceable such that alternative noses of the correct diameter can be used for different applications.

The method may comprise, before the fourth step, removing the detached portion of the upper layer from the workpiece using the punch.

It will be appreciated that because the detached portion is removed, a rivet and insert of relatively larger volume may be used within the joint. Because the rivet and insert are larger, they are able to withstand higher forces. The step of removing the detached portion may be achieved in numerous ways, for example by using an electromagnet, vacuum system or the like.

The punch may comprise an electromagnet. The method may further comprise energising the electromagnet so as to attract the detached portion of the upper layer thereto.

It will be appreciated that in such embodiments the detached portion must be composed of a ferromagnetic material in order for it to be attracted to the electromagnet (but only for those embodiments where the detached portion interacts with the electromagnet).

The method may comprise, before the fourth step, leaving the detached portion of the upper layer in situ.

By "leaving the detached portion in situ" it is meant that, once formed, the detached portion is not removed from the hole within the workpiece, and is therefore present within the formed joint. This has the effect that the detached portion is able to distribute the load applied by the punch during the joining process, so as to reduce residual stresses which remain in the formed joint and thereby avoid problems with cracking.

The method may comprise forming the hole in the upper layer by using a punching apparatus which is different to the punch and die.

As such, the hole may be pre-punched before the upper layer arrives at the production line, thus saving production line time.

The workpiece may comprise an advanced high strength steel or an ultra-high strength steel.

Advanced high strength steel (AHSS) may have tensile strength in excess of 550 MPa. Ultra-high strength steel (UHSS), which may have a tensile strength of at least 800 MPa.

The rivet may be formed from a material with a hardness of up to 510 Hv

The method of riveting may be a method of self-piercing riveting.

It will be appreciated that by "self-piercing riveting" it is meant substantially any riveting operation in which a rivet is driven into a workpiece in order to penetrate the workpiece.

According to a second aspect of the invention there is provided a rivet assembly comprising a rivet having a head and a shank depending downwardly from the head, the shank terminating in a tip and being hollow so as to define a rivet interior, and an insert having a base, wherein the insert is at least partially received within the rivet interior such that the base of the insert is located adjacent to the tip of the rivet.

It will be appreciated that by "rivet assembly" it is meant a group of individual components which comprise mating features such that, when assembled, the components may be handled as if they were a single entity (particularly when driven into a workpiece to form a joint). The individual components may be supplied together in an assembled state or may be supplied unassembled as a kit of parts.

As set out in relation to the first aspect of the invention, when the rivet and insert are driven into a workpiece the insert acts as a barrier to deflect the ripe of the rivet away from the central axis causing the tip of the rivet to flare radially outwards and create a strong mechanical interlock with the workpiece. This is particularly useful for riveting workpieces which comprise ultra-high strength materials, and permits a rivet of improved ductility to be used. Furthermore, the presence of the insert within the rivet in the formed join absorbs some of the natural elastic potential energy of the rivet which attempts to return the rivet to an undeformed state. In light of both of these effects, problems with cracking are avoided and the fatigue life of the joint is improved.

The insert may define an insert axis, and the insert further comprises an tapered insert surface which varies in diameter relative to the insert axis.

An advantage of the tapered insert surface is that during use when the rivet and insert are driven into the workpiece, the tapered insert surface directs the reaction force of the insert on the tip of the rivet radially outward, thus making flaring of the rivet easier.

The rivet may define a rivet axis, and the rivet may further comprise a tapered rivet surface which varies in diameter relative to the rivet axis.

An advantage of the tapered rivet surface is it that it provides a greater contact area between the rivet and the insert to encourage flaring of the tip of the rivet.

The insert axis and the rivet axis may be coaxial such that the tapered rivet surface against the tapered insert surface.

Because the tapered rivet surface is coaxial to the tapered insert surface, the reaction force applied to the rivet by the insert is even around the entire circumference of the rivet. As such, flaring is easier and more uniform.

The tapered rivet surface and the tapered insert surface may be curved relative to the direction of the rivet and insert axes.

It will be appreciated that by "curved relative to the direction of the rivet and insert axes" it is meant that viewed as a cross-section taken along the rivet and insert axes (in addition to their curvature about the rivet and insert axes). Furthermore, the tapered surfaces may be generally arcuate in shape. Because the tapered surfaces are curved, it will be appreciated that the direction of the reaction force between the rivet and insert can be controlled such that the rivet flares at an acute angle which relative to the rivet and insert axes. As such, more flaring is encouraged and therefore the mechanical interlock formed is stronger.

The tapered surface of the rivet and the tapered insert surface may be shaped to be conformal to one another.

It will be appreciated that by "conformal" it is meant that the tapered surfaces have substantially the same shape such that when the insert is received within the rivet, the tapered rivet surface and the tapered insert surface are flush with one another. Because the two tapered surfaces are conformal, the contact area between the rivet and insert available to cause flaring is increased, and thus flaring of the rivet is more efficiently promoted and the internal stresses experienced by the rivet and the insert are reduced.

The insert may further comprise an insert shank extending from the base, the insert shank being received within the rivet interior.

It will be appreciated that in such arrangements, both the shank of the rivet and the insert shank are able to transmit the force from a punch to the workpiece. As such, more cross-sectional area is available for transmitting the force and therefore the internal stresses experienced by the rivet shank are reduced. It follows that less strong and more ductile materials can then be used for the rivet and insert.

The insert shank may bear against an underside of the head of the rivet.

Because the insert shank bears against an underside of the head of the rivet, a force which is applied to the head of the rivet will be transferred to the shank.

The base of the insert may extend beyond the tip of the rivet.

The base of the rivet may extend axially beyond the tip of the rivet. The base of the rivet may extend radially beyond the tip of the rivet.

The rivet interior may be a through hole extending through the head of the rivet to the tip of the rivet.

Because the rivet interior is a though hole, it will be appreciated that a punch is able to apply a load directly upon the insert. Furthermore, the force may be supplied separately upon both the rivet and the insert, and the amount of force applied to the rivet and the insert may be adjusted to optimise the joining process.

According to a third aspect of the invention there is provided a rivet setting apparatus comprising a punch, and a die spaced apart from the punch along a central axis so that a rivet assembly and a workpiece may be received therebetween, wherein the punch is configured to drive a rivet assembly comprising a rivet and an insert at least partially received within the rivet into the workpiece, the rivet being driven under the action of a force from the punch, such that the die and insert react the force causing the rivet to flare outwardly and interlock the workpiece.

It will be appreciated that the rivet assembly may be a rivet assembly according to the second aspect of the invention. As set out above with respect to the first and second aspects of the invention, because the rivet setting apparatus is configured to drive a rivet assembly of the type which comprises an insert received within a rivet into the workpiece, the rivet setting apparatus is able to create joints in workpieces comprising ultra-high strength materials whilst avoiding problems with cracking.

The die may comprise a bore and a push rod received within the bore, wherein the push rod is movable relative to the bore, the bore and the push rod defining a cavity which is open at a side of the die facing the punch, the push rod being configured to react against the force so as to cause the rivet to flare outwardly and interlock the workpiece.

It will be appreciated that in order to cause the rivet to flare, the workpiece must into contact with an object which reacts against the force to redirect the energy of the force radially outwards. Where the riveting apparatus comprises a push rod, the push rod is able to contact the workpiece to react against the force and cause the rivet to flare. The position of the push rod relative to the die may be controlled so as to provide a cavity of desired depth, depending upon the thickness and material of the workpiece being joined.

The die may further comprise a sleeve surrounding the push rod, wherein the sleeve is movable relative to the die and the push rod, the sleeve being configured to retract along the central axis relative to the push rod so as to provide an annular cavity adjacent to the tip of the rivet to permit the rivet to flare and interlock the workpiece.

The sleeve may be generally tubular, such that it defines a hollow sleeve interior. In particular, the sleeve may be sized such that an inner diameter of the sleeve is larger than the diameter of a shank of the rivet by a small amount. The riveting operation may comprise driving the rivet and insert entirely through the workpiece such that a tip of the rivet protrudes from below the workpiece and into a region of space bounded by the sleeve. In such embodiments, the inner diameter of the sleeve defines the size of hole punched into the workpiece. However the sleeve constrains the tip of the rivet and prevents the rivet from flaring. By retracting the sleeve along the central axis relative to the die and the push rod, an annular region adjacent the tip of the rivet is exposed, thus permitting the rivet to flare and interlock the workpiece.

The punch may comprise an inner portion and an outer portion movable relative to one another along the central axis, wherein the punch is configured to apply the force to the rivet by urging the outer portion of the punch against a head of the rivet and urging the inner portion of the punch against the insert via a through hole formed in the rivet.

It will be appreciated that the through hole may define the rivet interior such that the rivet interior is open at opposed ends of the rivet. It will be appreciated that the inner portion of the punch should be sized such that it is able to pass into the rivet interior and contact the insert. Preferably, the inner portion of the punch is sized to be as large as possible to maximise contact area between the inner portion and the insert, whilst permitting relative movement between the rivet and the inner portion.

The punch may comprise a nose configured to punch a hole through an upper layer of the workpiece so as to leave a detached portion of the upper layer For example, the workpiece may comprise at least two separate layers of material to be joined. The size of the nose will determine the size of the hole punched in the workpiece, and therefore the size of the nose may be chosen such that it is slightly larger than the size of the corresponding rivet shank to ensure that the hole produced is large enough for the shank of the rivet to be received.

The nose may be tapered.

It will be appreciated that because the nose is tapered, the diameter of the punch decreases smoothly towards the point at which the punch contacts the rivet. As such, undesirable stress concentrations associated with having stepped changes in diameter are avoided.

The punch may comprise an electromagnet configured to attract the detached portion of the upper layer thereto.

Alternatively, the punch may comprise any other means suitable configured to attract the detached portion of the upper layer thereto, for example a vacuum system or the like. It will be appreciated that because the punch is able to attract the detached portion, the detached portion can be removed from the workpiece and therefore less force is required to cause the rivet and insert to sit flush with the upper layer of the workpiece in the finished join.

The electromagnet may be disposed in a nose of the punch.

According to a fourth aspect of the invention there is provide an insert for a rivet assembly according to the second aspect of the invention.

According to a fifth aspect of the invention there is provided a vehicle comprising a riveted joint formed according to the first aspect of the invention.

The advantages set out above in relation to the features of one of the aspects of the invention apply equally to other aspects of the invention having the same or equivalent features. The optional features set out above in relation to any one aspect of the invention may be combined with any of the other aspects of the invention.

BRIEF DESCRIPTION OF THE DRAWINGS

Embodiments of the invention will now be described, by way of example only, with reference to the accompanying schematic drawings, in which.

DETAILED DESCRIPTION

Figure 1A:
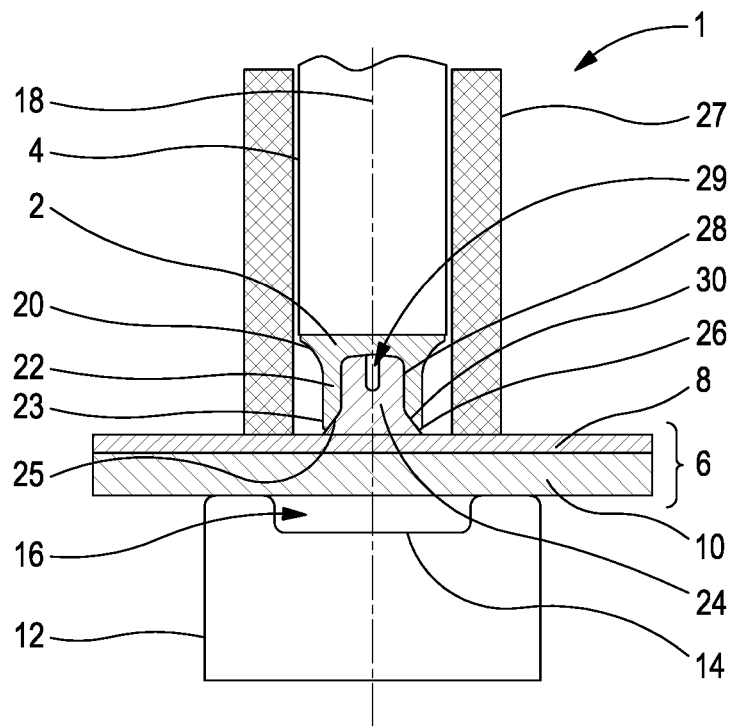
FIGS. 1a, to 1c are schematic cross-sectional views of three sequential steps of a riveting process according to a first embodiment of the present invention.

In the description of the specific embodiments of the invention which follows, like reference numerals are used to refer to the same or corresponding features of the invention throughout all of the embodiments. It will be appreciated that where one or more advantages are attributable to a feature or group of features that such advantages are equally applicable to all embodiments of the invention having that feature or group of features. Likewise, it will be appreciated that where a suitable alternative to a particular feature or group of features is given in relation to one of the embodiments, such alternative features may be equally applicable to other embodiments of the invention having that feature or group of features.

FIG. 1a shows a first step of a riveting process according to a first embodiment of the present invention. A rivet setting apparatus 1 is provided which comprises a punch 4 and a die 12 arranged along a central axis 18. A rivet 2 is provided between the punch 4 and a workpiece 6. The workpiece 6 comprises an upper layer 8 and a lower layer 10. The workpiece 6 is positioned above the die 12. The die 12 comprises a recessed surface 14 which defines a cavity 16 that is open in a direction facing towards the punch 4. The cavity 16 defines a diameter which is larger in comparison to a diameter of a shank 22 of the rivet 2. The rivet 2, punch 4, and cavity 16 are axially aligned along a central axis 18. The rivet setting apparatus 1 further comprises a clamp nose 27 which surrounds the punch 4. The clamp nose 27 is configured to clamp the workpiece 6 against the die 12 so as to hold the workpiece 6 in place throughout the riveting process.

The rivet 2 is generally cylindrical and defines a rivet interior which is hollow and closed at one end by a head 20. The shank 22 extends downwards from the head 20. The head 20 extends radially outwards from the shank 22 relative to the central axis 18 so as to form a circumferentially extending lip. The shank 22 is a generally hollow cylinder and defines the rivet interior. A distal end of the shank 22 opposite the head 20 defines a tip 23 of the rivet 2. The tip 23 is relatively narrow compared to the thickness of the remainder of the shank 22. A radially inner surface of the shank 22 adjacent the tip 23 defines a tapered rivet surface 25 which increases in diameter relative to the central axis 18. That is to say, the diameter of the tapered rivet surface 25 is the same as the internal diameter of the shank 22 where it meets the shank 22, and is wider at a position closest to the tip 23. It will be appreciated that in the context of the present invention, a tapered surface means a surface of changing diameter relative to the central axis 18, and does not require that the surface is planar or conical. In the present embodiment the tapered rivet surface 25 is curved in the axial direction relative to the central axis 18 between the inner cylindrical walls of the shank 22 and the tip 23. However, in alternative embodiments the tapered rivet surface 25 may have substantially any shape which changes in diameter relative to the central axis 18, and for example may be conical. Furthermore, in some embodiments the tip 23 of the rivet 2 may define a generally planar annular surface and/or filleted portions, such as for example in the rivet constructions disclosed by WO 2007/132194 which is incorporated herein by reference.

A generally cylindrical insert 24 is positioned within the hollow region of the rivet 2. The insert 24 comprises a base 26 and a shank 28 which extends upwards from the base 26 (these are hereafter referred to as the insert base 26 and insert shank 28). The insert shank 28 defines an insert cavity 29. The insert 24 has an axis which is substantially coaxial with the central axis 18 of the rivet setting apparatus 1. The geometry of the insert 24 is such that it substantially conforms to the internal geometry of the shank 22 of the rivet 2. As such, the external diameter of the insert shank 28 is approximately the same diameter as the inner diameter of the shank 22 of the rivet 2 (albeit slightly narrower so as to permit the insertion of the insert 24 within the rivet 2). The insert base 26 has an outer diameter which is greater than an outer diameter of the shank 22 of the rivet 2. The insert base 26 extends axially beyond the tip 23 of the rivet 2, such that the insert base 26 contacts the workpiece 6 before the rivet 2.

The upper surface of the insert shank 28 bears against the head 20 of the rivet 2 so that forces acting on the rivet head 20 are passed directly into the insert shank 28. The insert shank 28 and the insert base 26 are connected by a tapered insert surface 30 which conforms to the tapered rivet surface 25 of the rivet 2. That is to say, the tapered insert surface 30 is also curved in the direction of the central axis 18 and is shaped such that it is wider at the base 26. In particular, the curvature of the tapered insert surface 30 substantially matches that of the tapered rivet surface 25 of the rivet 2 such that the two fit flush against one another in a mating relationship. It will be appreciated that in alternative embodiments the tapered insert surface 30 may have substantially any shape which changes in diameter relative to the central axis 18, and for example may be conical.

In some embodiments, the insert 24 may be specifically designed to conform to the geometry of the interior of the rivet 2 (for example, such that the tapered surfaces of the rivet 2 and insert 24 are matching). However, in other embodiments the insert 24 itself may be a self-piercing rivet of a smaller size than the rivet 2 and which is simply inserted into the hollow region of the rivet 2 in a reverse orientation along the central axis 18 (i.e. so that it is "upside down").

The insert 24 may for example be held in the rivet 2 by friction (i.e. press-fitting). The rivet 2 may be provided with an anti-corrosion coating. The anti-corrosion coating may assist in providing adhesion between the rivet and the insert. The insert 24 may also be provided with the anti-corrosion coating, although in the embodiment depicted in FIG. 1 because the insert will be fully enclosed after the joint has been formed the insert may have no an anti-corrosion coating.

Figure 1B:
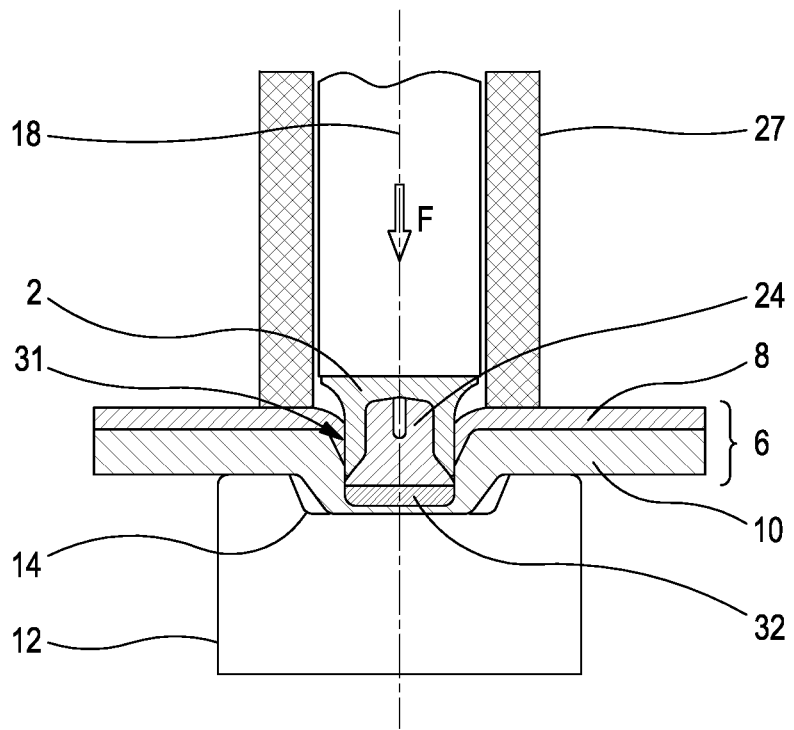

FIG. 1b shows a second step of the riveting process of the first embodiment of the invention. During use, the punch 4 exerts force on the rivet 2 along the central axis 18 sufficient to drive the rivet 2 and insert 24 into the workpiece 6. This may be achieved in any suitable manner. In one suitable configuration, the setting apparatus 1 comprises a flywheel and a linkage configured to produce linear movement of the punch 4 in response to rotational movement of the flywheel. The flywheel is selectively engageable via a clutch so as to transfer the rotational energy of the flywheel into a force F directed along the central axis 18. In an alternative arrangement, an electrical motor or hydraulic actuator may drive the punch 4 into the workpiece directly (i.e. without using a flywheel and linkage).

The force F pushes the rivet 2 and insert 4 towards the die 12 to puncture the upper layer 8 and cause the lower layer 10 to yield. In particular, the action of the force F causes an upper layer hole 31 to form within the upper layer 8, leaving a detached portion 32 of the upper layer 8 (otherwise known as a slug) to be trapped between the insert 24 and the lower layer 10. The force F causes the lower layer 10 of the workpiece to come into contact with the recessed surface 14 of the die 12. The recessed surface 14 reacts against the force F and prevents further movement of the lower layer 10 in the direction of the central axis 18. This compresses the lower layer 10 against the recessed surface 14 and causes the lower layer 10 to spread radially outwards relative to the central axis 18.

The insert base 26 protects the shank 22 of the rivet 2 when it is inserted into the workpiece. That is, it is the base 26 which exerts force on the upper layer 8 of the workpiece and cuts through it. In a conventional arrangement, with no insert present, the bottom end of the rivet shank 22 exerts force on the upper layer of the workpiece and cuts into it. However, if the workpiece is formed from a material such as AHSS or UHSS then the rivet shank may not be sufficiently strong to penetrate through the upper layer, and may buckle instead. If a thicker rivet shank is used in order to avoid such buckling then it may be too thick to flare sufficiently, and thus may fail to form a strong interlock in the workpiece. These problems are avoided by the invention because, as noted above, the insert penetrates the upper layer and protects the rivet shank.

Figure 1C:
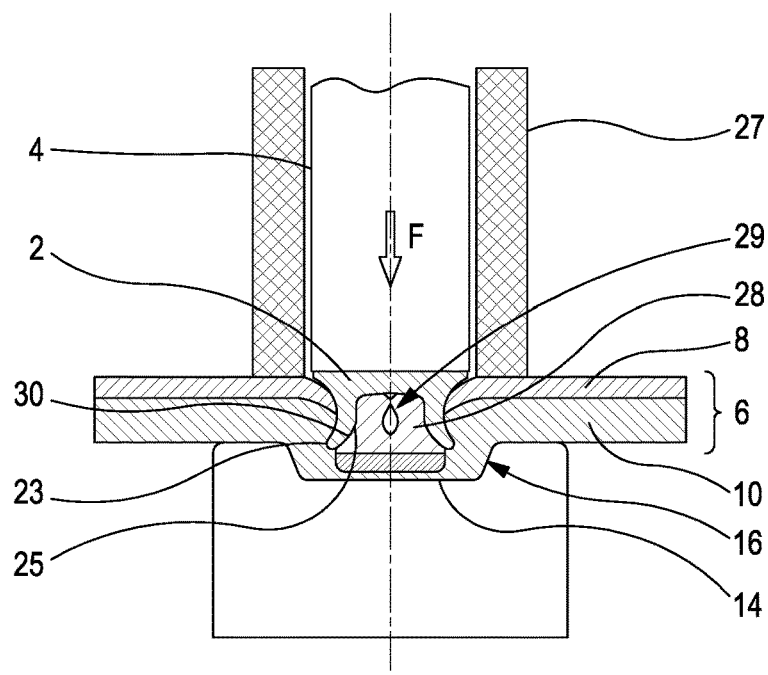

FIG. 1c shows a third step of the riveting process of the first embodiment of the invention. From the position shown in FIG. 1b, the punch 4 continues to drive the rivet 2 and insert 24 against the die 12 until the rivet 2 and insert 24 reach the position shown in FIG. 1c. The insert base 26 cannot travel further towards the die due to the presence of the lower workpiece layer 10 and the slug 32 of the upper workpiece layer 8. Instead, as a result of the downward force exerted on the insert 24, the insert collapses. The rivet head 20 continues to move downwards due to the force exerted by the punch 4. As the insert 24 collapses it causes the shank 22 of the rivet 2 to flare outwardly (as depicted). That is, the tapered rivet surface 25 of the rivet 2 and the tapered insert surface 30 bear against one another so as to cause the tip 23 of the rivet 2 to flare outwardly. The flaring causes the rivet shank 22 to partially penetrate the lower layer 10 of the workpiece 6, and provides a good interlock between the rivet 2 and the workpieces 8, 10. The upper layer 8 and lower layer 10 of the workpiece 6 are held in compression between the tip 23 and the head 20 of the rivet 2. The interlock formed by the rivet 2 may be corrosion-resistant.

The recessed surface 14 of the die 12 continues to prevent further movement of the lower layer 10 of the workpiece 6 in the direction of the central axis 18 and therefore the lower layer 10 spreads radially outwards into the remainder of the cavity 16. The insert head 26 provides a planar surface which, in combination with the slug 32, helps to ensure that the portion of the lower layer 10 below the slug has a desired thickness. For example, accidental penetration of the lower layer 10 is avoided because downward movement of the slug 32 is well controlled by the insert head 26.

Dimensions of the insert shank 28, such as the diameter and depth of the insert cavity 29 may be selected so that the insert shank will collapse when a particular load is applied to the rivet. The force needed to insert a rivet into a workpiece increases as insertion of the rivet progresses. Thus, the insert 24 may be sufficiently strong to withstand an initial part of the rivet insertion process but will collapse as the rivet insertion process progresses. This collapsing of the insert 24 is desirable because it promotes flaring of the rivet shank 22. Preferably, the insert 24 collapses after the insert has passed through the upper workpiece layer 8. It may be desirable for the insert 24 to collapse after the lower workpiece layer 10 has been thinned to its final position. If the insert 24 collapses earlier then it may drag material from the lower workpiece layer 10 outwards in an undesirable manner.

The above described riveting operation is particularly suitable for joining workpieces where the upper layer 8 is composed of a high strength material such as AHSS or UHSS and the lower layer 10 is composed of a softer material such as aluminium. In one example, the upper layer 8 may be UHSS (e.g. with a thickness of 1.5 mm), and the lower layer 10 may be 5000 or 6000 series aluminium (e.g. with a thickness of 2 mm).

In prior art riveting methods (for example those which do not use an insert 24), the entire force is transferred to the workpiece through the shank of a rivet. This force must be large when the upper layer is formed from a high strength material such as AHSS or UHSS. It will be appreciated that the shank 22 is therefore subject to extremely high internal stresses. Consequently, the rivet is made of a hardened material so that it does not buckle. However, rivets having such high material hardness typically exhibit poor ductility and retain relatively high internal stresses once deformed. As explained above, where high internal stresses remain in the rivet (and/or the workpiece) 2, this can lead to the formation of cracks which structurally weaken the joint and/or leave the joint vulnerable to corrosion. In addition, rivets with poor ductility do not flare sufficiently to provide a strong interlock with the workpiece.

The present invention provides various improvements over the prior art. The relative shapes of the tapered rivet surface 25 of the rivet 2 and tapered insert surface 30 of the insert 24 encourage flaring of the tip 23 of the rivet 2. It has been found that such flaring is best achieved where the tapered rivet surface 25 of the rivet 2 and the tapered insert surface 30 are curved (with the insert having a concave surface). However, in alternative embodiments the tapered surfaces 25, 30 may define other geometries (for example, the tapered surfaces 25, 30 may be flat-sided, such that they are frusto-conical or the like). Because the insert 24 promotes flaring of the rivet 2, if a high strength but poor ductility metal is used for the rivet 2, the riveting process is still able to produce flaring of the rivet tip 23 sufficient to create a mechanical interlock.

Furthermore, because the insert 24 remains within the completed joint, the insert 24 is able to resist the tendency of the rivet tip 23 to return to its undeformed position (an effect known as elastic spring-back). The rivet 24 therefore absorbs much of the internal compressive stress experienced by the rivet 2, thus alleviating problems with cracking.

Additionally, the insert base 26 protects the rivet shank 22, and consequently the rivet may be formed from a more ductile material without the rivet shank buckling. Preferably, the insert 24 is formed from a material which is harder than the rivet 2, so that the rivet penetrates the workpiece and causes the rivet to deform. Since the rivet 2 may be made of a relatively ductile material, outward flaring of the rivet 2 does not result in high residual stresses, and therefore problems with cracking are avoided. The insert 24 may for example be formed from a material which has a hardness of 555 Hv or more, or a hardness of 575 Hv or more. The rivet 2 may for example be formed from a material which has a hardness of for example between 400 Hv and 510 Hv. Examples of material which may be used to form the rivet are 35B2 (steel with boron) and 36MnB4 (steel with manganese and boron). Other materials may be used. In general, the insert 24 may be formed from metal, and the rivet 2 may be formed from metal.

Because flaring of the rivet 2 is assisted by the presence of the insert 24, it will be appreciated that it is not necessary for the die to comprise any special geometry configured to encourage flaring of the tip 23 of the rivet 2. As such, the die may comprise a simple recessed portion such as recessed surface 14, or may even be entirely flat. Furthermore, because the presence of the insert 24 causes the rivet to flare, the depth of the recessed surface 14 can be made quite shallow. For example the recessed portion of the die may be 2 mm or less. In some embodiments the die may have no recess. Having a shallow die is advantageous when joining lower ductility materials because less flowing of the materials is needed.

The rivet 2 may for example be a conventional rivet having a 7.75 mm diameter head with for example a shaft diameter of 5.1, 5.3 or 5.5 mm. The cavity 29 in the shank 22 may for example have a diameter of 3.5 mm. The insert 24 may for example have an insert shank 28 of 3.5 mm. Providing the insert 24 with the same diameter as the cavity 29 in the shank 22 allows the insert to be engaged with a push-fit into the cavity such that it is retained within the cavity and does not fall out prior to insertion of the rivet into a workpiece. In general, providing the insert shank 28 with the same diameter as the cavity 29 in the rivet shank 22 may desirably allow a push-fit of the insert in the cavity.

Although the upper layer 8 may be composed of an "ultra-high strength" material, it will be appreciated that in alternative embodiments of the invention the upper layer 8 and lower layer 10 may be composed of substantially any suitable materials which can be joined using a self-piercing riveting process (and need not be limited to the example materials listed above).

In general, for this embodiment and other embodiments, the insert protects a lowermost end of the rivet feet during piercing of the upper layer of the workpiece. In addition, the inert causes the shank of the rivet to flare in a controlled manner (the flaring will follow the shape of the insert). Without the invention the rivet shank would be liable to fracture or to bend outwards without piercing the upper layer of the workpiece. A piercing load is applied to the upper layer of the workpiece via the insert. Advantageously, embodiments of the invention allow a rivet to be used which is sufficiently strong to penetrate an AHSS or UHSS upper workpiece layer (due to support provided by the insert) and sufficiently ductile to flare in a desired manner (flaring being controlled by the insert).

An advantage of embodiments of the invention is that they allows a conventional rivet to be used to form a joint in a workpiece which comprises AHSS or UHSS. This avoids the need to fabricate a specialist rivet.

Although the workpiece depicted in FIGS. 1*a*-*c* consists of two layers, the workpiece may consist of more than two layers. In general, embodiments of the invention may be used to form a joint in a workpiece which comprises two or more layers.

Figure 2A:
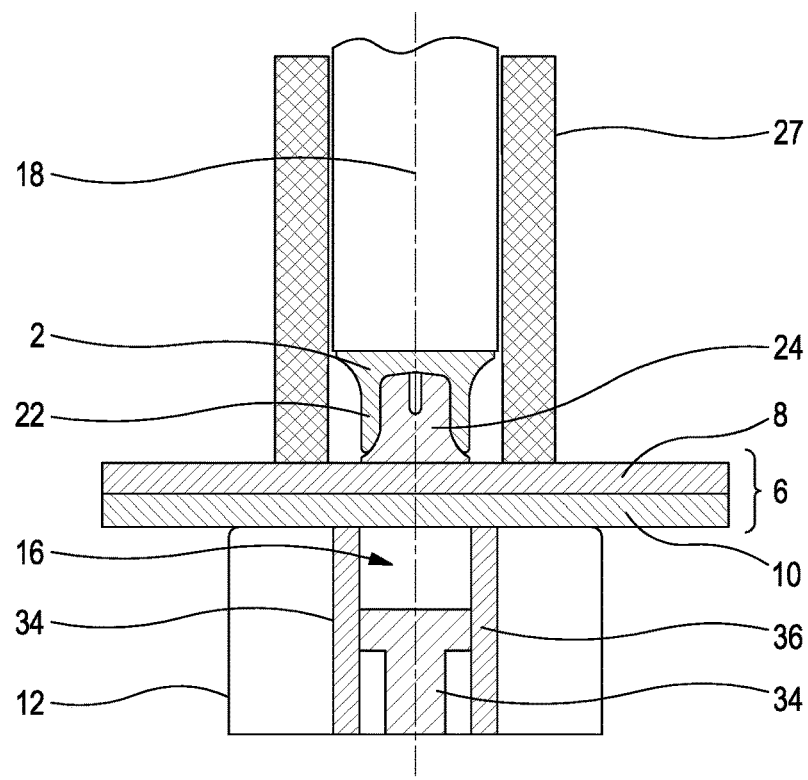
FIGS. 2a to 2c are schematic cross-sectional views of three sequential steps of a riveting process according to a second embodiment of the present invention.

FIG. 2*a* shows a first step of a second embodiment of a riveting process according to the present invention. The second embodiment of the invention differs from the first embodiment in that the die 12 comprises a bore 34 having a sleeve 36 and a push rod 38 disposed therein. The sleeve 36 is a generally hollow cylinder and the push rod 38 is an elongate solid cylinder having a top portion of increased diameter so that fits flush with the inside of the sleeve 36 (although it will be appreciated that the push rod 38 may be of substantially constant diameter). The internal diameter of the sleeve 36 is larger than the external diameter of the shank 22 of the rivet 2 by an appropriate clearance. The bore 34, sleeve 36 and push rod 38 are aligned concentrically relative to the central axis 18. The sleeve 36 and push rod 38 are configured so that they are separately moveable relative to one another and the bore 34. The positions of the sleeve 36 and the push rod 38 can be controlled using a controller via any suitable control mechanism, such as for example hydraulics, pneumatics, lead screws or the like. Suitable control mechanisms for the sleeve 36 and push rod 38 may be of the types disclosed in WO 2012/063022 and WO2012/063023, which are incorporated herein by reference. In the first step of the second embodiment, the sleeve 36 is positioned so that it is flush with the top of the die 12, and the push rod 34 is axially spaced from the top of the die 12 so as to define a cavity 16.

As with the embodiment of FIG. 1, an insert 24 is provided in the rivet 2. The insert 24 may for example be held in the rivet 2 by friction (i.e. press-fitting). The rivet 2 may be provided with an anti-corrosion coating. The insert 24 may also be provided with the anti-corrosion coating. This may be advantageous because the insert will be exposed after the joint has been formed. The anti-corrosion coating may assist in providing adhesion between the rivet and the insert.

Figure 2B:
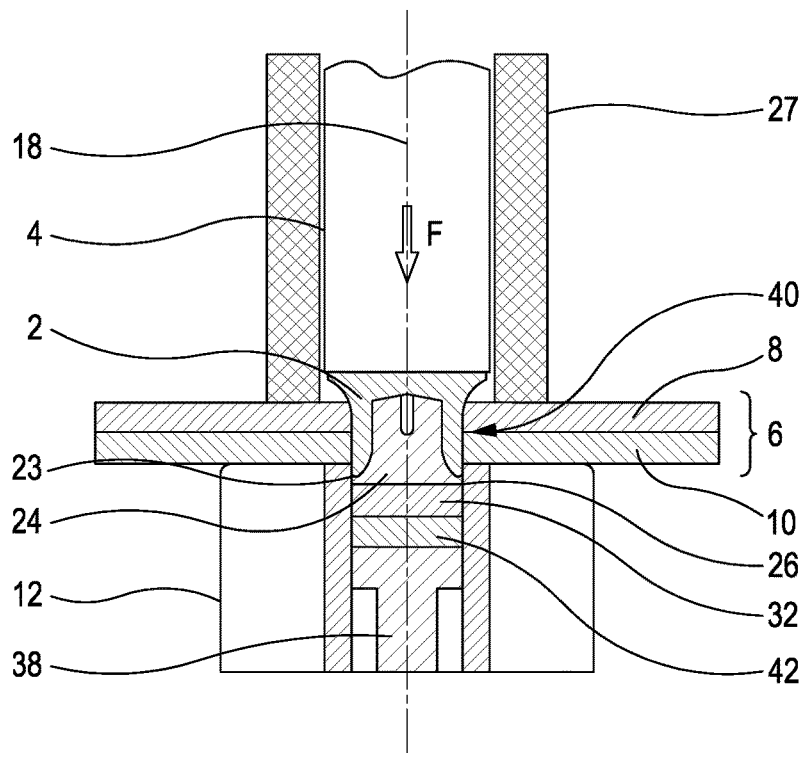

FIG. 2*b* shows a second step of the riveting process of the second embodiment of the invention. In the second step, the punch 4 is driven along the central axis 18 towards the die 12 under the action of the force F. This causes the rivet 2 and insert 24 to puncture the upper layer 8 and the lower layer 10 of the workpiece 6 such that the tip 23 of the rivet 2 and the base 26 of the insert 24 protrude below a bottom surface of the lower layer 10. In particular, the force F causes a through hole 40 to form which penetrates both the upper layer 8 and the lower layer 10, leaving a detached portion 32 of the upper layer 8 and a detached portion 42 of the lower layer 10. The rivet 2 and insert 24 are driven along the central axis 18 until the detached portion 42 of the lower layer comes into contact with the push rod 38, filling the cavity 16.

Figure 2C:
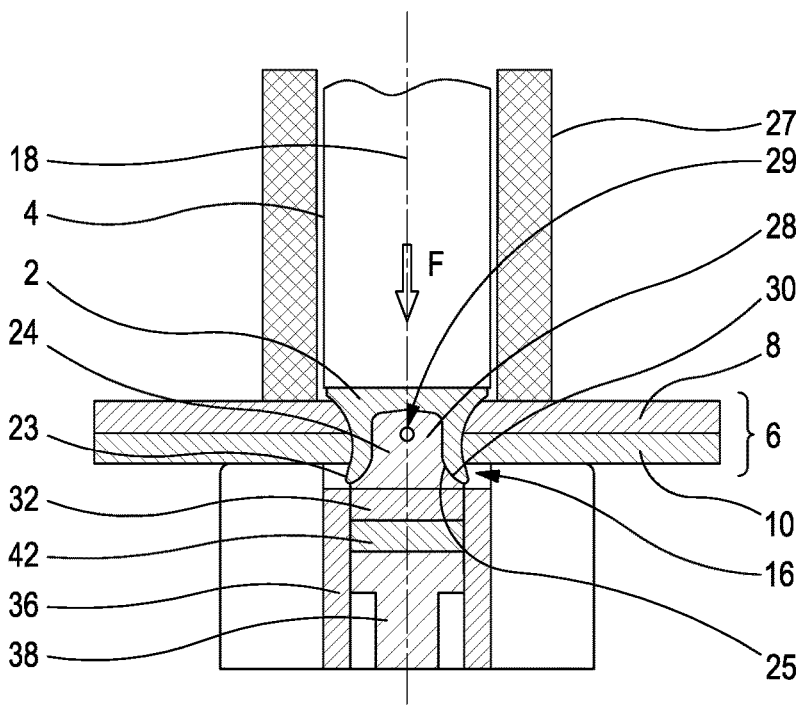

FIG. 2*c* shows a third step of the riveting process of the second embodiment of the invention. In the third step, the sleeve 36 is retracted along the central axis 18 so that the top of the sleeve 38 is flush with (or below) the detached portion 32 of the upper layer 8. This re-opens the cavity 16 so that it is annular in shape extending circumferentially around the tip 23 of the rivet 2 within the bore 34. The force F continues to push the rivet 2 and the insert 24 along the central axis 18, however further movement of the rivet 2 and insert 24 in this direction is prevented by the presence of the detached portion 32 of the upper layer 8. As such, the rivet 2 begins to spread radially outwards from the central axis 18 and into the cavity 16. In particular, as described above with respect to the first embodiment, the tapered rivet surface 25 of the rivet 2 and the tapered insert surface 30 bear against one another so as to cause the tip 23 of the rivet 2 to flare outwardly and into the cavity 16. The outward flaring holds the upper layer 8 and lower layer 10 of the workpiece 6 in compression between the tip 23 and the head 20 of the rivet 2 and thereby forms a mechanical interlock preventing separation of the upper layer 8 and lower layer 10 of the workpiece 6. Continued application of the force F causes the insert shank 28 to buckle (as shown in FIG. 2*c*).

It will be appreciated that because the through hole 40 fully penetrates both the upper layer 8 and the lower layer 10 of the workpiece 6, the rivet 2 is able to hold the entire thickness of the lower layer 10 in compression (as opposed to only part of the lower layer 10, such as in the first embodiment). As such, the degree of flaring experienced by the tip 23 of the rivet 2 of the second embodiment need only be sufficient to ensure that, once deformed, the outer diameter of the tip 23 is wider than the inner diameter of the through hole 40 by a small amount to form the interlock. The interlock may for example be between 0.1 mm and 0.5 mm. Because the rivet 2 does not need to be deformed by a large amount to form the interlock, this means that the residual stresses which remain in the rivet 2 and the workpiece 6 after deformation are reduced and therefore problems with cracking are avoided.

After the step shown in FIG. 2c, the punch 4 is retracted and the fully joined workpiece 6 can be removed. The sleeve 36 and push rod 38 are then actuated upwards and out of the die 12 so as to eject the detached portion 32 of the upper layer 8 and the detached portion 42 of the lower layer 10 from the bore 34 ready for the next riveting operation. The detached portions 32, 42 may be removed in any suitable manner, such as for example by using a compressed air gun or an electromagnet (depending upon the materials used).

Figure 3A:
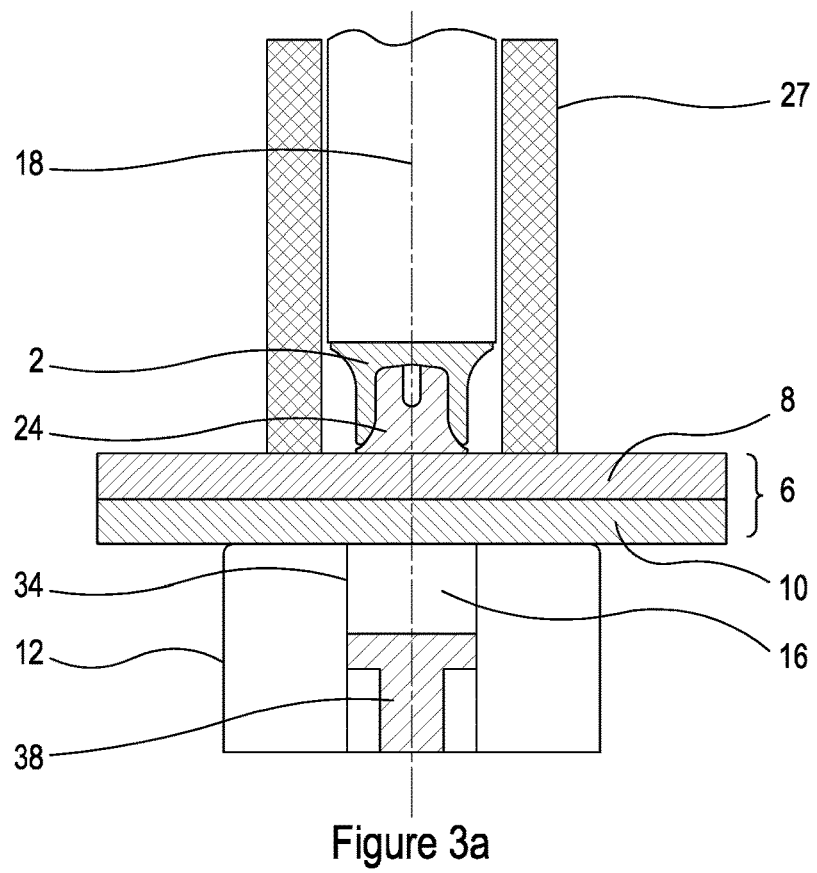
FIGS. 3a to 3c are schematic cross-sectional views of three sequential steps of a riveting process according to a third embodiment of the present invention.

FIG. 3a shows a first step of a third embodiment of a riveting process according to the present invention. The third embodiment differs from the second embodiment in that it does not require the use of a sleeve. As such, the die 12 comprises a bore 34 within which a push rod 38 is moveable along the central axis 18. The bore 34 has a diameter which is larger than the diameter of the shank 22 of the rivet 2 by a suitable clearance, for example by at least 0.5 mm, for example by 1 mm or more, for example by up to 2 mm. The push rod is an elongate solid cylinder having a top portion of increased diameter so that it fits flush with the wall of the bore 34 (although it will be appreciated that in alternative embodiments the push rod 38 may be of substantially constant diameter). The push rod 38 is spaced from the top of the die 12 so as to define a cavity 16.

As with the embodiment of FIG. 2, an insert 24 is provided in the rivet 2. The insert 24 may for example be held in the rivet 2 by friction (i.e. press-fitting). The rivet 2 may be provided with an anti-corrosion coating. The insert 24 may also be provided with the anti-corrosion coating. This may be advantageous because the insert will be exposed after the joint has been formed. The anti-corrosion coating may assist in providing adhesion between the rivet and the insert.

Figure 3B:
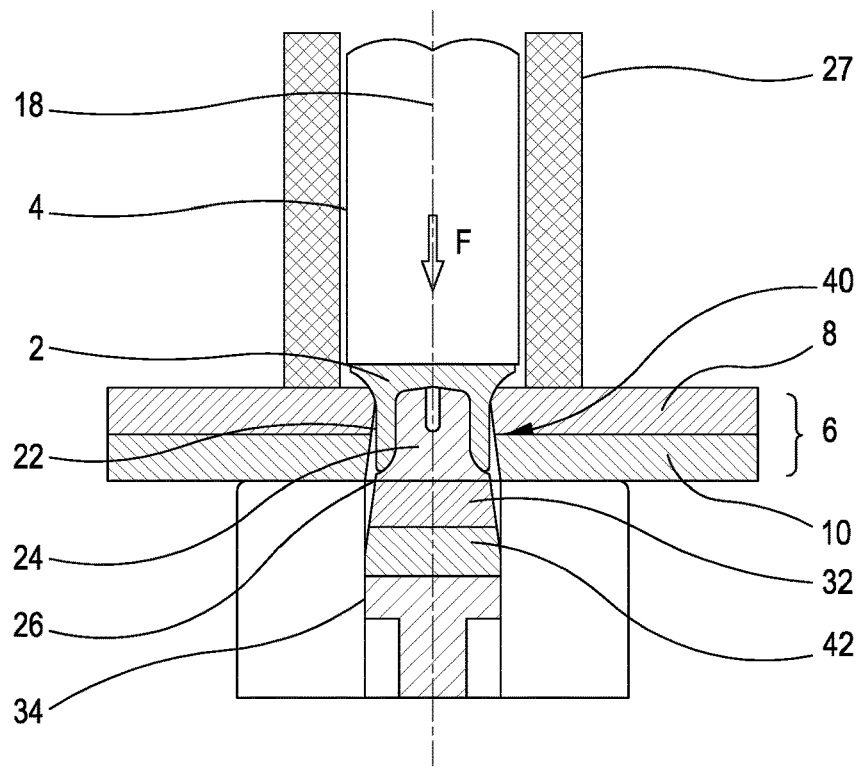

FIG. 3b shows a second step of the riveting process of the third embodiment of the invention. In the second step, the punch 4 is driven along the central axis 18 towards the die 12 under the action of the force F. This causes the rivet 2 and insert 24 to puncture the upper layer 8 and the lower layer 10 of the workpiece 6 such that the base 26 of the insert 24 is level with a bottom surface of the lower layer 10. In particular, the force F causes a through hole 40 to form which penetrates both the upper layer 8 and the lower layer 10, leaving detached portion 32 of the upper layer 8 and detached portion 42 of the lower layer 10. Because the bore 34 is only larger than the outer diameter of the shank 22 of the rivet 2 by a suitable clearance, deformation of the material of the upper and lower layers 8, 10 of the workpiece 6 in the region immediately surrounding the base 26 of the insert 24 is restricted (if the clearance is too big then the lower layer will fracture inwardly of the bore and will drag material down into the bore).

The lower layer 10 is pierced at the bottom against the die 12 and bore 34, whereas the upper sheet is pierced by the base 26 of the insert 24. The through hole 40 is tapered as a result, because of the different diameters of bore 34 of the die 12 and the base 26 of the insert 24. This is beneficial because it leaves some room adjacent to the rivet shank, making it much easier for the shank to flare and provide a desired interlock.

Figure 3C:
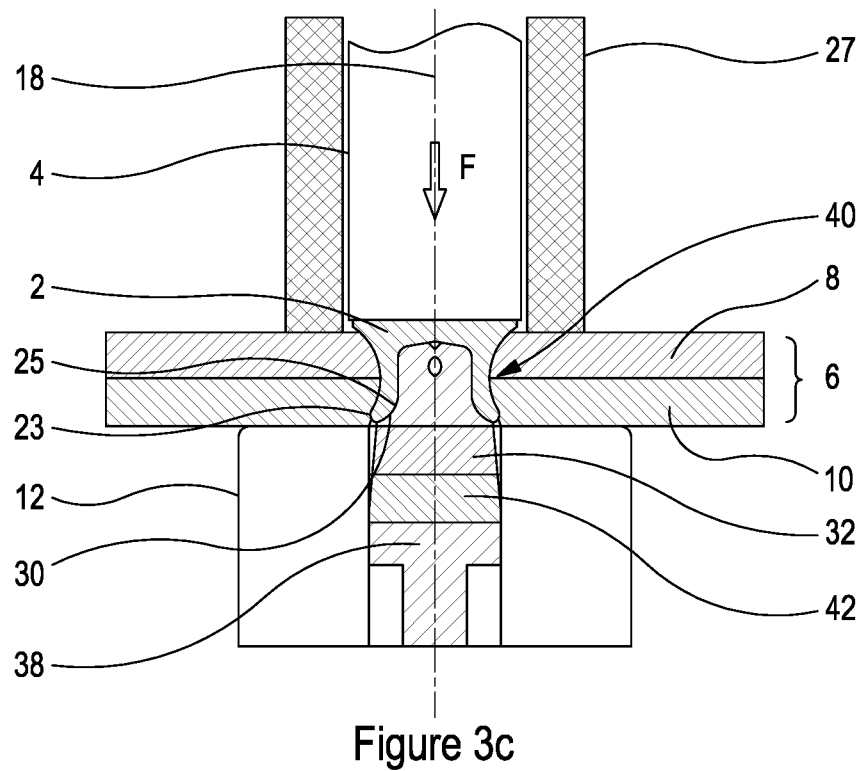

FIG. 3c shows a third step of the riveting process of the third embodiment of the invention. In the third step, the punch 4 continues to urge the rivet 2 and insert 24 against the detached portion 32 of the upper layer 8. However, because of the tapered sides of the through hole 40, the tip 23 of the rivet 2 is able to flare radially outwards to form an interlock with the workpiece 6. In particular, the tapered rivet surface 25 and the tapered insert surface 30 bear against one another so as to cause the tip 23 to flare radially outwardly relative to the central axis 18. Continued application of the force F causes the insert shank 28 to buckle (as shown in FIG. 3c).

After the step shown in FIG. 3c, the punch 4 is retracted away from the fully joined workpiece 6. The push rod 38 is then actuated so as to eject the detached portion 32 of the upper layer 8 and the detached portion 42 of the lower layer 10 from the bore 34 ready for the next riveting operation. The detached portions 32, 42 may be removed in any suitable manner, such as for example by using a compresses air gun or an electromagnet (depending upon the materials used).

Figure 4A:
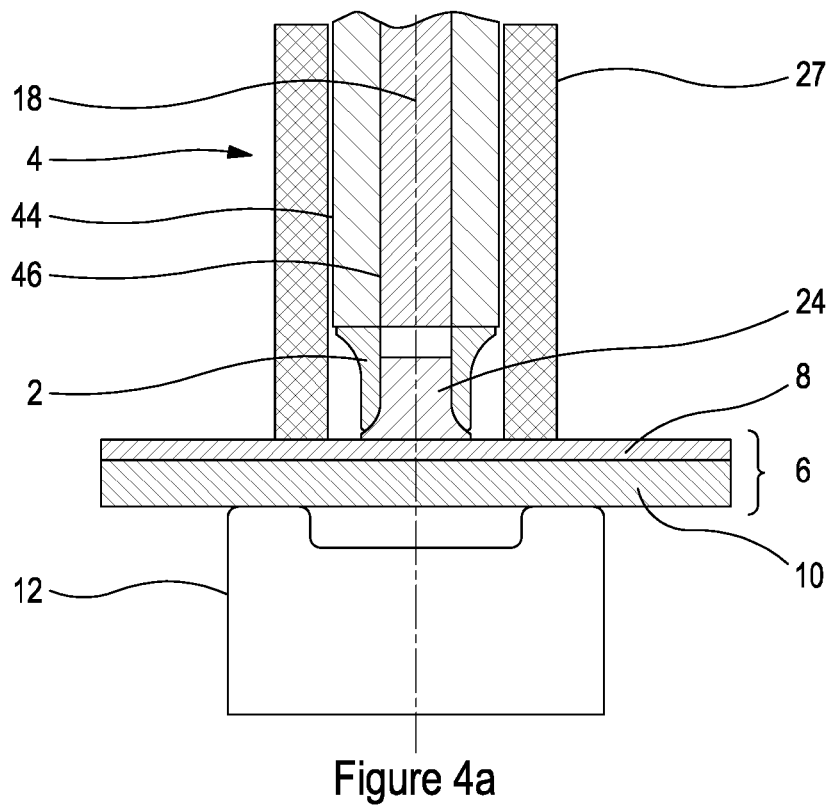
FIGS. 4a to 4c are schematic cross-sectional views of three sequential steps of a riveting process according to a fourth embodiment of the present invention.

FIG. 4a shows a first step of a fourth embodiment of a riveting process according to the present invention. The fourth embodiment differs from the first embodiment in that the hollow region of the rivet 2 is a through hole which extends through the head 20 to the tip 23 of the rivet 2, so as to leave the rivet 2 open at both ends (such that the rivet is generally tubular). Furthermore, the punch 4 of the fourth embodiment comprises an outer portion 44 and an inner portion 46 which are arranged concentrically relative to the central axis 18. The outer portion 44 and inner portion 46 of the punch 4 are independently translatable along the central axis 18 relative to one another. The outer portion 44 is formed of a generally hollow cylinder within which inner portion 46 is received. The inner portion 46 is generally cylindrical, and is sized to fit flush with the inner wall of the outer portion 44. In the first step, the clamp nose 27 holds the workpiece 6 in place against the die 12, and the rivet 2 and insert 24 are contained within the clamp nose 27. Due to the use of the clamp nose 27, the outer portion 44 and inner portion 46 of the punch 4 do not need to be in contact with the rivet 2 and insert 24 before application of the force F. In some embodiments, the outer portion 44 of the punch 4 contacts the head portion 20 of the rivet 2 so as to hold the rivet 2, insert 24 and workpiece 6 in position between the punch 4 and the die 12.

Figure 4B:
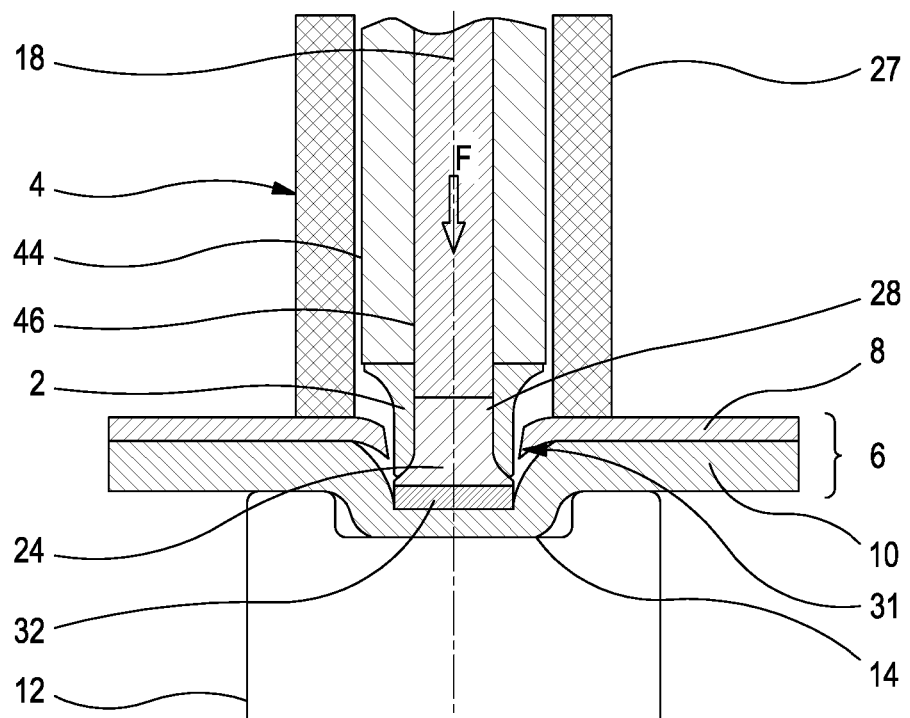

FIG. 4b shows a second step of the riveting process of the fourth embodiment of the invention. In the second step, the inner portion 46 of the punch 4 has moved downwards so that it contacts the top of the insert shank 28 of the insert 24. As such, the lowermost point of the inner portion 46 of the punch 4 is closer to the die 12 than the outer portion 44. This is to take account of the difference in height between the insert 24 and the rivet 2. The fourth embodiment of the invention is therefore able to tolerate various different heights of the insert 24 (although it will be appreciated that in some embodiments the insert 24 and the rivet 2 may have substantially the same height). The outer portion 44 and the inner portion 46 of the punch 4 are then urged simultaneously along the central axis 18 in the direction of the die 12 under the action of a force F. This causes the rivet 2 and insert 24 to puncture the upper layer 8 of the workpiece 6 so as to form a upper layer hole 31 within the upper layer 8. This results in the formation of a detached portion 32 of the upper layer 8 which is compressed between the lower layer 10 and the insert 24. The lower layer 10 is deformed such that it comes into contact with the recessed surface 14 of the die 12.

Figure 4C:
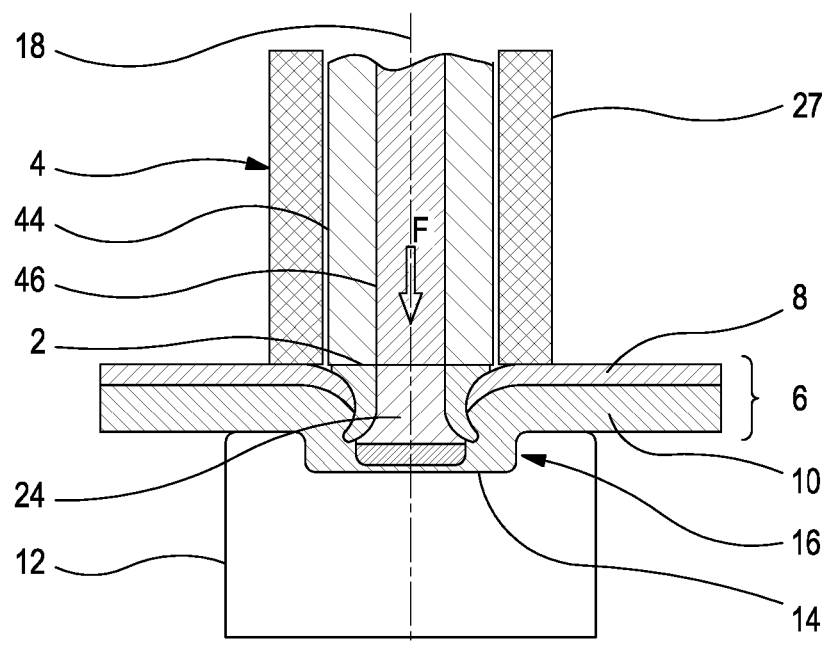

FIG. 4c shows a third step of the riveting process of the fourth embodiment of the invention. In the third step, the rivet 2 and insert 24 continue to be driven towards the die 12 under the action of the force F. The recessed surface 14 of the die 12 prevents further movement of the lower layer 10 of the workpiece 6 in the direction of the central axis 18, and as a result the lower layer 10 is forced to spread radially outwards relative to the central axis 18 and into the remainder of the cavity 16. Once the top of the insert 24 is flush with the top surface of the upper layer 10, movement of the inner portion 46 of the punch 4 is halted whilst the rivet 2 continues to be urged towards the die 12. The tapered rivet surface 25 and the tapered insert surface 30 bear against one another so as to cause the tip 23 to flare radially outwardly relative to the central axis 18 so that the rivet 2 partially penetrates the lower layer 10 of the workpiece 6. The outwards flaring of the rivet 2 forms a mechanical interlock preventing separation of the upper layer 8 and lower layer 10 of the workpiece 8. In alternative embodiments, the outer portion 44 and inner portion 46 of the punch 4 may be configured so that they arrive at the position shown in FIG. 4c at the same time (i.e. such that there is no need to wait until the rivet 24 is flush with the upper layer 10 of the workpiece 6 before moving the outer portion 44 relative to the inner portion). The inner portion 46 and the outer portion 44 of the punch 4 may descend together (i.e. travelling at the same speed). The inner portion 46 of the punch 4 may protrude beyond the outer portion 44 of the punch as they descend, such that the inner portion of the punch is incident on the insert 24 before the outer portion of the punch is incident upon the rivet 2. As a result, movement of the insert 24 into the workpiece 6 begins before movement of the rivet 2 into the workpiece.

It will be appreciated that the outer portion 44 and the inner portion 46 of the punch 4 are able to apply loads to the rivet 2 and insert 24 respectively. As such, the loads applied to the rivet 2 and insert 24 may be selected to be different so that the internal stresses experienced by either the rivet 2 or the insert 24 remain below a critical value. This provides greater flexibility to use different materials within the riveting process.

Figure 5A:
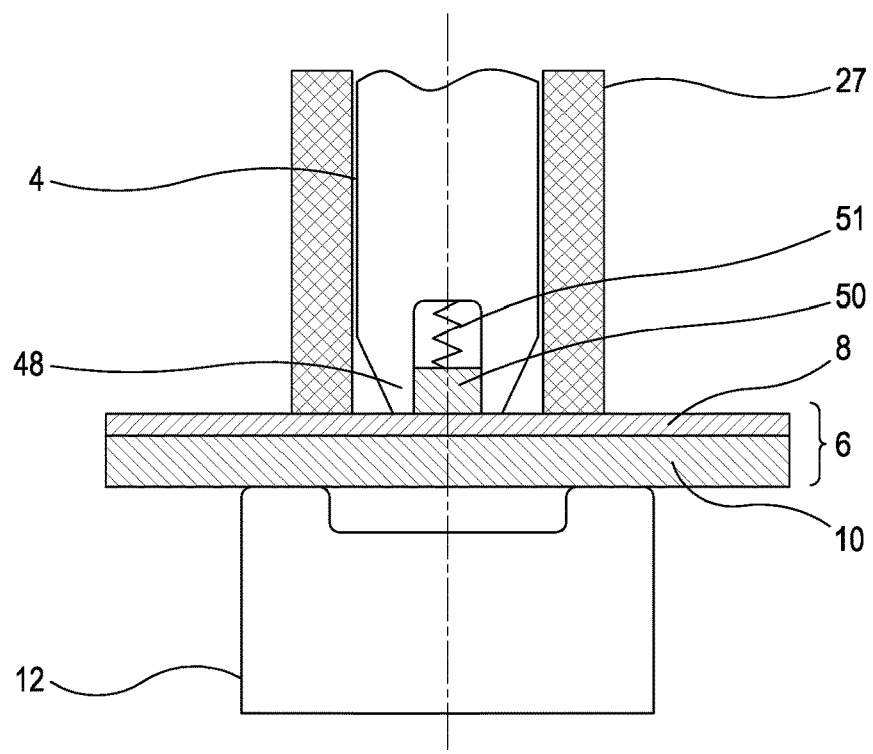
FIGS. 5a to 5e are schematic cross-sectional views of five sequential steps of a riveting process according to a fifth embodiment of the present invention.

FIG. 5a shows a first step of a fifth embodiment of a riveting process according to the present invention. The fifth embodiment differs from the previous embodiments of the invention primarily in that a hole is pre-punched into the upper layer 8 before the rivet 2 and insert 24 are presented for joining. The punch 4 of the fifth embodiment comprises a tapered nose 48 having an electromagnet 50 disposed at an end thereof. The electromagnet 50 is connected to the punch 4 by a spring 51. In the first step, the workpiece 6 is clamped against the die 12 by the clamp nose 27.

Figure 5B:
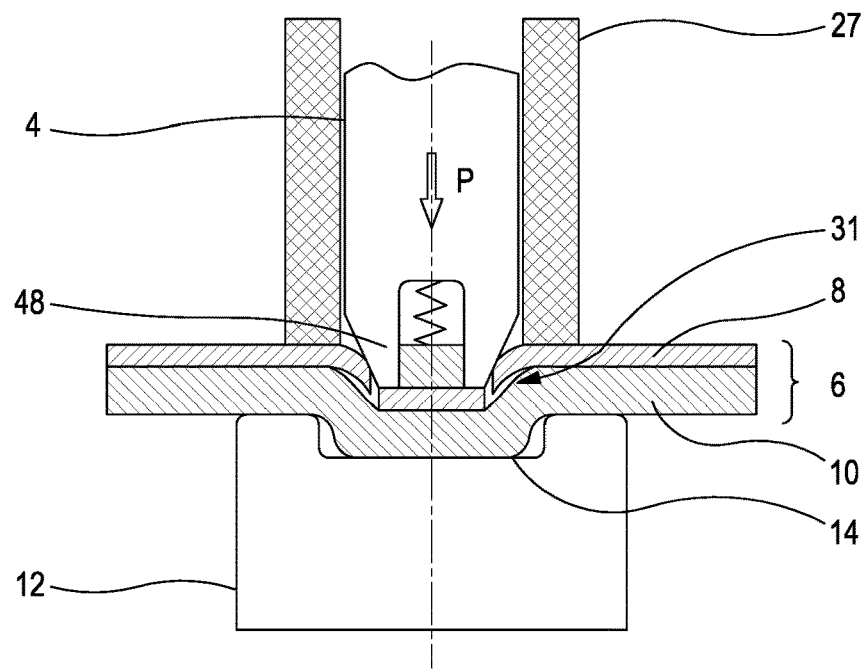

FIG. 5b shows a second step of the riveting process according to the fifth embodiment of the invention. In the second step, the punch 4 is urged against the upper layer 8 of the workpiece 6 towards the die 12 under the action of a punching force P. The punching force P is generated in the same manner as the force F described in relation to the other embodiments, such as for example using a flywheel and clutch arrangement. The punching force P typically has a short duration such that it creates an impulse. The impulse is sufficient to cause the nose 48 of the punch 4 to puncture the upper layer 8 of the workpiece 6 so as to punch an upper layer hole 31 in the upper layer 8 leaving a detached portion 32. Alternatively, the punching force P may be applied gradually (such that it is not an impulse). The diameter of the terminal end of the nose 48 is selected so that the upper layer hole 31, once formed, is sufficiently wide to be able to receive the shank 22 of a rivet (discussed below). At the same time, the lower layer 10 of the workpiece 6 is deformed such that it comes into contact with the recessed surface 14 of the die 12. The tapered shape of the punch 48 prevents the punch 48 becoming stuck in the upper layer hole 31 once formed. The tapered shape of the punch 48 also bends the upper layer downwards. This provides a rivet head shape in the upper layer which can subsequently receive a rivet. This is advantageous because the rivet head then experiences no spring-back load from the upper layer (spring-back load may be significant if the upper layer is formed from a lower ductility material such as UHSS material).

Figure 5C:
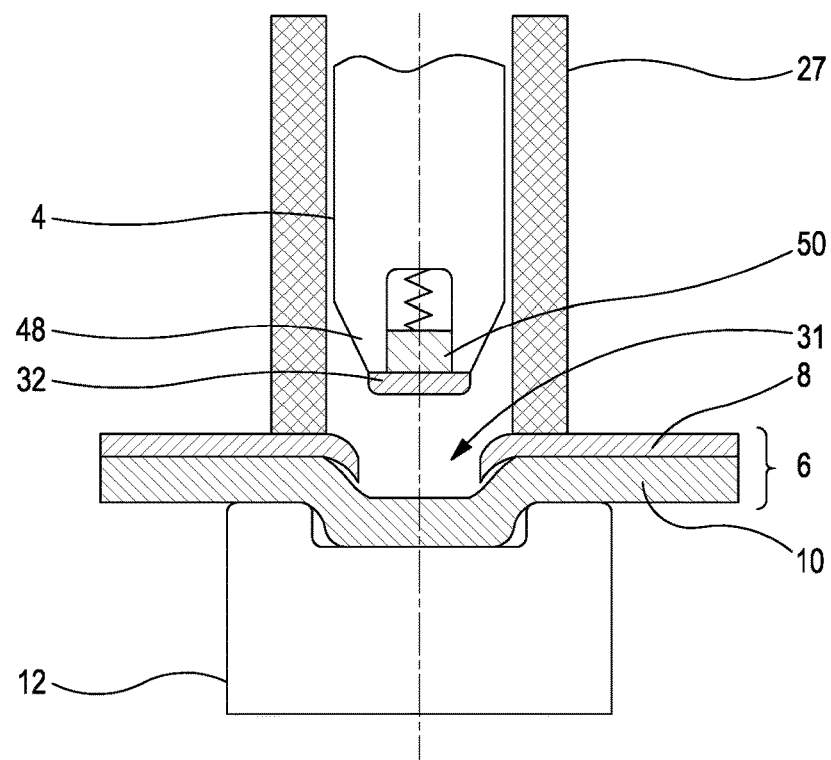

FIG. 5c shows a third step of the riveting process according to the fifth embodiment of the invention. In the third step, the electromagnet 50 is activated so as to cause the detached portion 32 of the upper layer 8 to be magnetically fixed thereto. As such, the upper layer 8 is composed of a ferromagnetic material, such as for example steel (e.g. martensitic steel, AHSS, UHSS). The punch 4 is then moved away from the die 12 along the central axis 18 so that the nose 48 and detached portion 32 are clear of the upper layer hole 31. The electromagnet is then de-energised so that the detached portion 32 can be removed, such as for example by hand, using a blower, mechanical gripper, secondary electromagnet or the like.

Figure 5D:
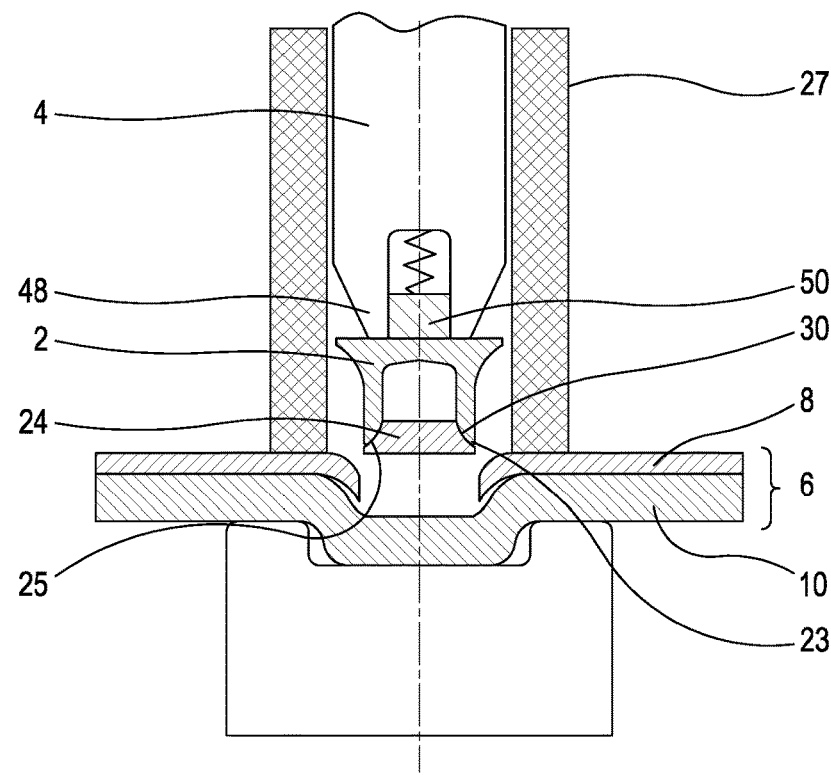

FIG. 5d shows a fourth step of the riveting process according to the fifth embodiment of the invention. In the fourth step, the detached portion is removed from the punch 4 and replaced with a rivet 2 and insert 24. The rivet 2 is held in position by re-activating the electromagnet 50 so that the rivet 2 becomes magnetically fixed to the nose 48 of the punch 4. The insert 24 is supplied with the rivet 2 as a single assembly, the insert 24 being received by the tip 23 of the rivet 2. Unlike the inserts of the previous embodiments, the insert 24 shown in FIG. 5d does not comprise an insert shank and instead comprises only a base 26 and tapered insert surface 30. The tapered insert surface 30 is shaped to conform to the tapered rivet surface 25. In some embodiments, the electromagnet is powerful enough that it is able to hold both the rivet 2 and the insert 24 under the force of magnetism alone. However, it will be appreciated that this is not an essential requirement of the fifth embodiment of the invention, and that in other embodiments the insert may be held in place by friction (i.e. press-fitting) and/or using adhesive. In yet further alternative embodiments, the rivet 2 and insert 24 may simply be inserted into the upper layer hole 31 separately, and without first being held against the punch 4. The rivet 2 and/or insert 24 may be provided with an anti-corrosion coating. The anti-corrosion coating may assist in providing adhesion between the rivet and the insert.

Figure 5E:
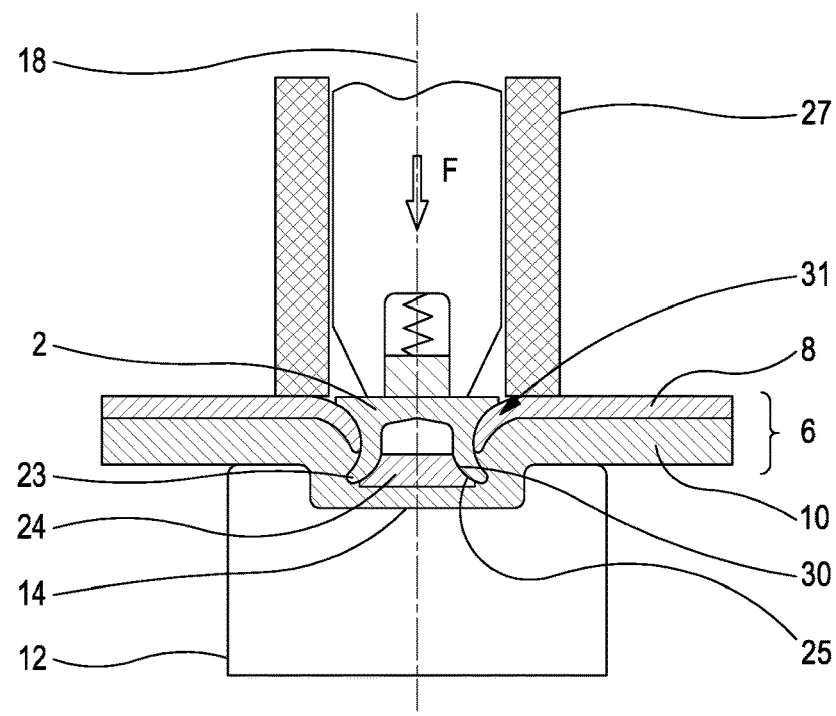

FIG. 5e shows a fifth step of the riveting process according to the fifth embodiment of the invention. In the fifth step, the rivet 2 and insert 24 are lowered into the upper layer hole 31 and urged against the lower layer 10 under the action of a force F. As noted above, the diameter of the upper layer hole 31 is sufficiently large to be able to receive the shank 22 of the rivet 2. The recessed surface 14 of the die 12 prevents further movement of the rivet 2 and insert 24 along the central axis 18 towards the die 12. Continued application of the force F causes the tapered rivet surface 25 and the tapered insert surface 30 to bear against one another. The conformal shapes of the tapered rivet surface 25 and the tapered insert surface 30 causes the tip 23 of the rivet 2 to flare radially outwardly relative to the central axis 18 and partially penetrate the lower layer 10 of the workpiece 6. The radial flaring of the tip 23 is greater than the diameter of the upper layer hole 31 so as to partially undercut the upper layer 8, resulting in a mechanical interlock that prevents separation of the upper layer 8 and lower layer 10 of the workpiece 6.

Because the upper layer 8 is pre-punched by the punch 4 before the rivet 2 and insert 24 are presented for joining, only the punch 4 needs to be able to withstand sufficient force to puncture the upper layer 8 of the workpiece 6, as opposed to the rivet 2 itself. The force F in the fifth embodiment may therefore be smaller than the equivalent forces in the previous embodiments, because the stronger upper layer 8 has already been punched by the driver under the application of punching force P. The rivet 2 and insert 24 only need to be able to withstand the force F and not the punching force P. It follows that there is no need for the rivet 2 or insert 24 to be made from an ultra-high strength material strong enough to withstand the high internal stresses associated with puncturing the upper layer 8 (where the upper layer 8 is made from an ultra-high strength material such as UHSS or the like). As such, a lower strength and more ductile material can be used for the rivet 2 and insert 24 such that the problems with residual stresses and cracking set out in the introduction are avoided.

Furthermore, pre-punching of the upper layer 8 means that the rivet 2 is subjected to lower internal stresses and therefore does not need the support of an insert shank to prevent it from collapsing. The insert 24 therefore may comprise only an tapered insert surface 30 to cause flaring of the tip 23 of the rivet 2 (and not a shank). The above notwithstanding, it will be appreciated that in alternative embodiments of the invention, the insert 24 may comprise an insert shank which acts in the same manner as described above in relation to the previous embodiments of the invention. This may be particularly advantageous where the lower layer 10 is also composed of an ultra-high strength material, since the shank portion will support the rivet 2 as it penetrates into the lower layer 10.

It will be appreciated that in alternative embodiments of the invention, the upper layer 8, rivet 2 and/or insert 24 may be made from non-ferromagnetic materials. In such embodiments, the electromagnet 50 may be replaced by an equivalent system configured to hold the detached portion 32 and/or rivet 2 to the nose 48 of the punch 4 which does not rely on magnetism. For example, the electromagnet 50 could be replaced by a vacuum port or the like.

Figure 6A:
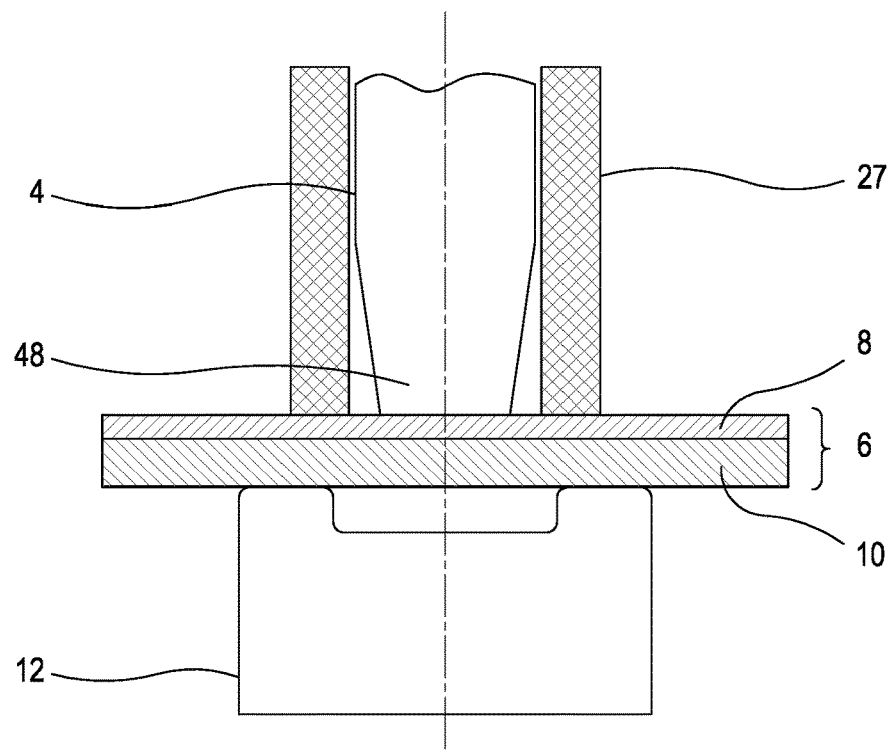
FIGS. 6a to 6d are schematic cross-sectional views of four sequential steps of a riveting process according to a sixth embodiment of the present invention.

FIG. 6a shows a first step of a sixth embodiment of a riveting process according to the present invention. In common with the fifth embodiment of the invention, in the sixth embodiment the upper layer 8 is pre-punched by the punch 4. However, the sixth embodiment of the invention differs from the fifth embodiment in that the detached portion 32 remains in the completed joint. As shown in FIG. 6a, although the punch 4 comprises a tapered front end 48, it does not comprise any means for attracting a detached portion of the upper layer 8 thereto (such as the electromagnet of the fifth embodiment). In the first step, the upper layer 8 and lower layer 10 are held against the die 12 under the action of the clamp nose 27. The tapered shape of the front end 48 of the punch 4 prevents the punch becoming stuck in an upper layer hole 31 once formed. The tapered shape of the punch 48 also bends the upper layer downwards. This provides a rivet head shape in the upper layer which can subsequently receive a rivet. This is advantageous because the rivet head then experiences no spring-back load from the upper layer (spring-back load may be significant if the upper layer is formed from a lower ductility material such as UHSS material).

Figure 6B:
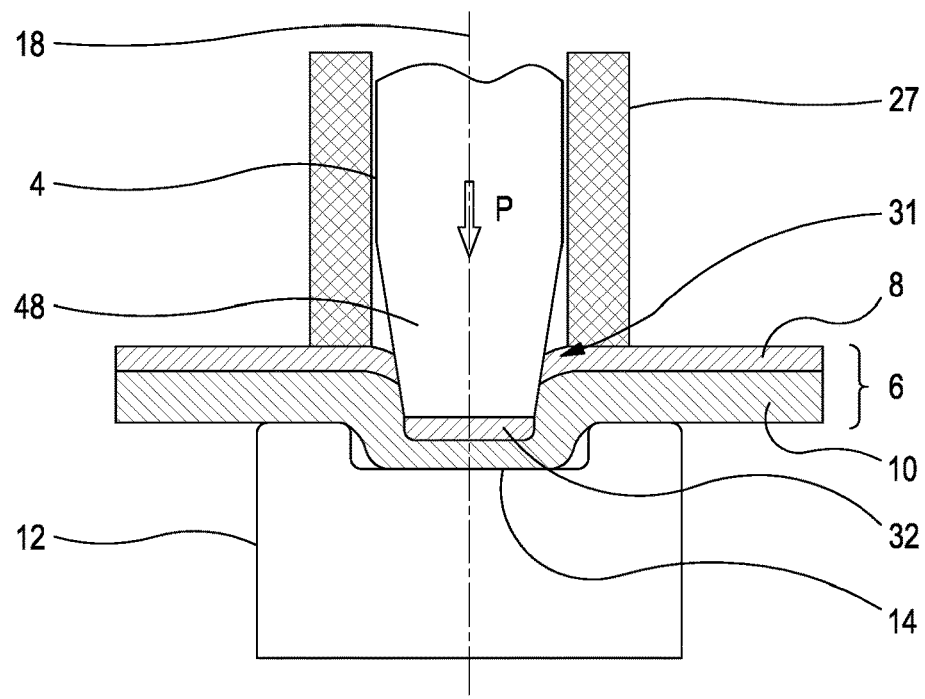

FIG. 6b shows a second step of the riveting process according to the sixth embodiment of the invention. In the second step, the punch 4 is urged against the upper layer 8 of the workpiece 6 towards the die 12 under the action of a punching force P. The punching force P may be generated according to the description above in relation to the fifth embodiment of the invention, and may impart an impulse to the workpiece 6. The punching force P is sufficient to cause the front end 48 of the punch 4 to shear the upper layer 8 of the workpiece 6 so as form an upper layer hole 31 in the upper layer 8 leaving a detached portion 32. The diameter of the terminal end of the front end 48 is selected so that the upper layer hole 31, once formed, is sufficiently wide to be able to receive the shank 22 of a rivet (discussed below). At the same time, the lower layer 10 of the workpiece 6 is deformed such that it comes into contact with the recessed surface 14 of the die 12.

Figure 6C:
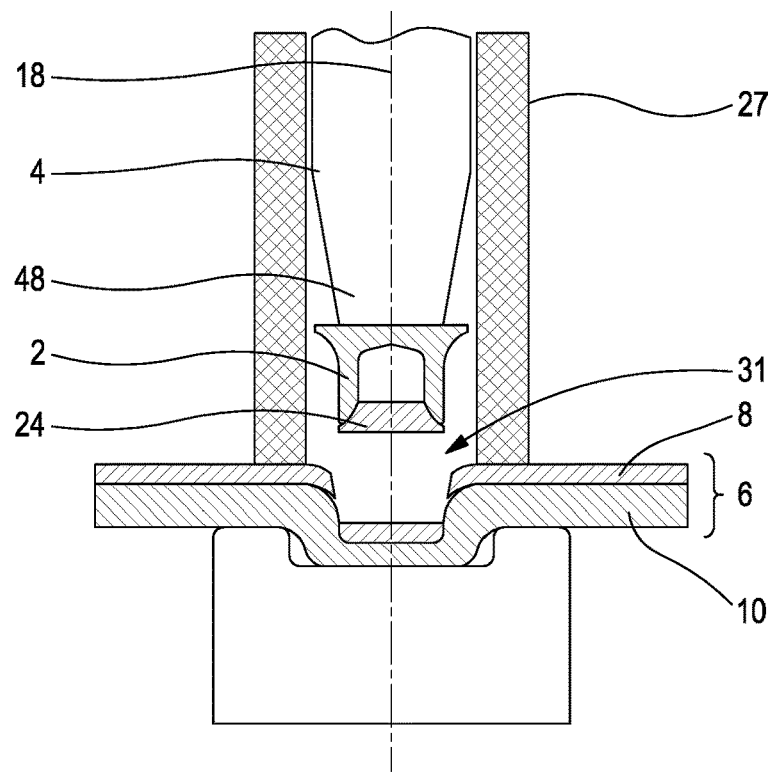

FIG. 6c shows a third step of the riveting process according to the sixth embodiment of the invention. In the third step, the punch 4 is retracted along the central axis 18 away from the die 12. The rivet 2 and insert 24 may then attached to the front end 48 of the punch 4, such as for example using an electromagnet (not shown), adhesive or the like. Alternatively, the rivet 2 and insert 24 may simply be inserted into the upper layer hole 31 without first being held against the punch 4.

Figure 6D:
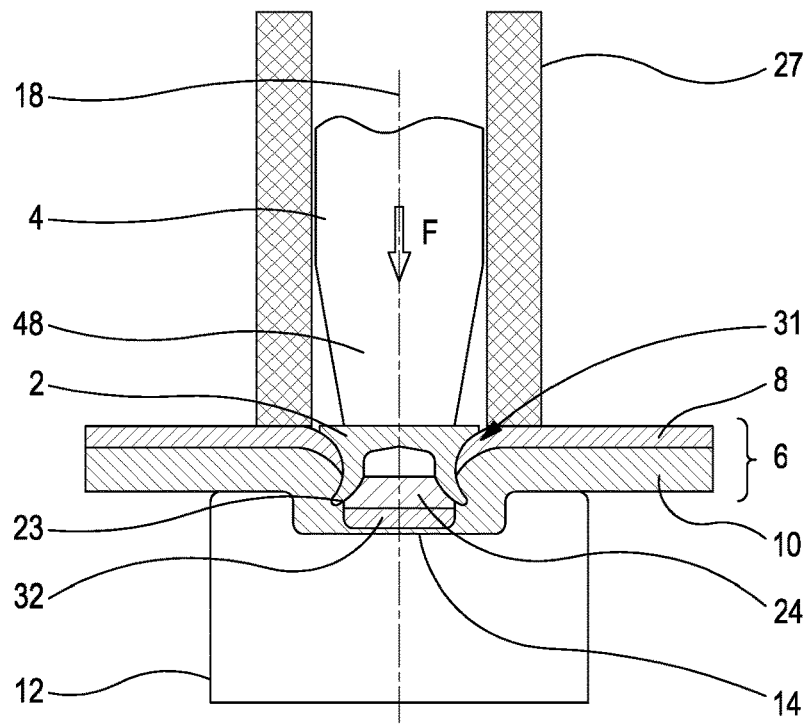

FIG. 6d shows a fourth step of the riveting process according to the sixth embodiment of the invention. In the fourth step, the rivet 2 and insert 24 are lowered into the upper layer hole 31 and urged against the lower layer 10 under the action of an force F. The recessed surface 14 of the die 12 reacts against movement of the rivet 2 and insert 24 in the direction of the central axis 18 towards the die 12. Continued application of the force F causes the tapered rivet surface 25 and the tapered insert surface 30 to bear against one another and cause the tip 23 of the rivet 2 to flare radially outwardly relative to the central axis 18 so as to partially penetrate the lower layer 10 of the workpiece 6. The radial flaring of the tip 23 is greater than the diameter of the upper layer hole 31 so as to partially undercut the upper layer 8, resulting in a mechanical interlock that prevents separation of the upper layer 8 and lower layer 10 of the workpiece 6.

Because the detached portion 32 of the upper layer 8 is not removed from the join, the riveting process of the sixth embodiment of the invention saves time and expense in that the detached portion 32 does not need to be disposed of.

It will be appreciated that the sixth embodiment of the invention may be modified. For example if desired in order to provide additional strength an insert which includes a shank may be used in place of the insert 24 depicted in FIGS. 6a to 6d.

Figure 7A:
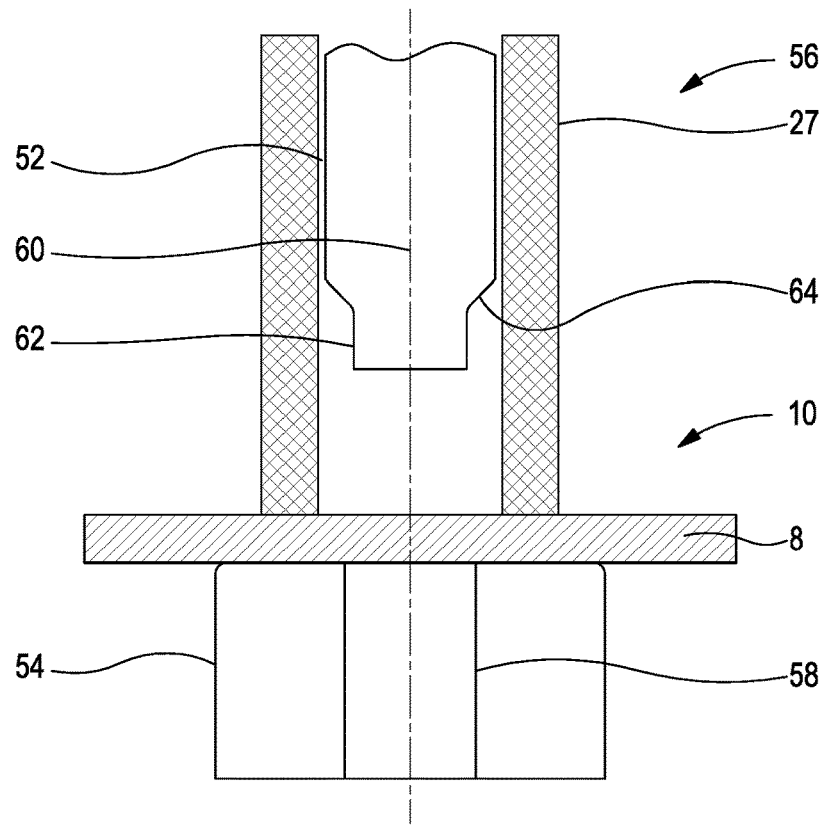
FIGS. 7a to 7g are schematic cross-sectional views of seven sequential steps of a riveting process according to a fifth embodiment of the present invention.

FIG. 7a shows a first step of a seventh embodiment of a riveting process according to the present invention. The seventh embodiment is similar to the fifth and sixth embodiments of the invention in that a hole is punched into the upper layer 8 of the workpiece 6 before the rivet 2 and insert 24 are presented for joining. However, in contrast to the previous embodiments, the step of punching the hole in the upper layer 8 of the workpiece 6 is conducted using a dedicated punching apparatus, and the step of driving the rivet and insert into the workpiece is conducted using a separate rivet setting apparatus.

In the first step, the upper layer 8 of the workpiece 6 is placed between a punch 52 and punch die 54 of a punching apparatus 56. The punch die comprises a punch bore 58 aligned with the punch 52 along a punch axis 60. The punch 52 comprises a punch nose 62 which is generally cylindrical and has a diameter which is smaller than the punch bore 58 by a suitable clearance. The diameter of the punch nose 62 is narrower than the diameter of the remainder of the punch, and is joined to the remainder of the punch by a tapered portion 64.

Figure 7B:
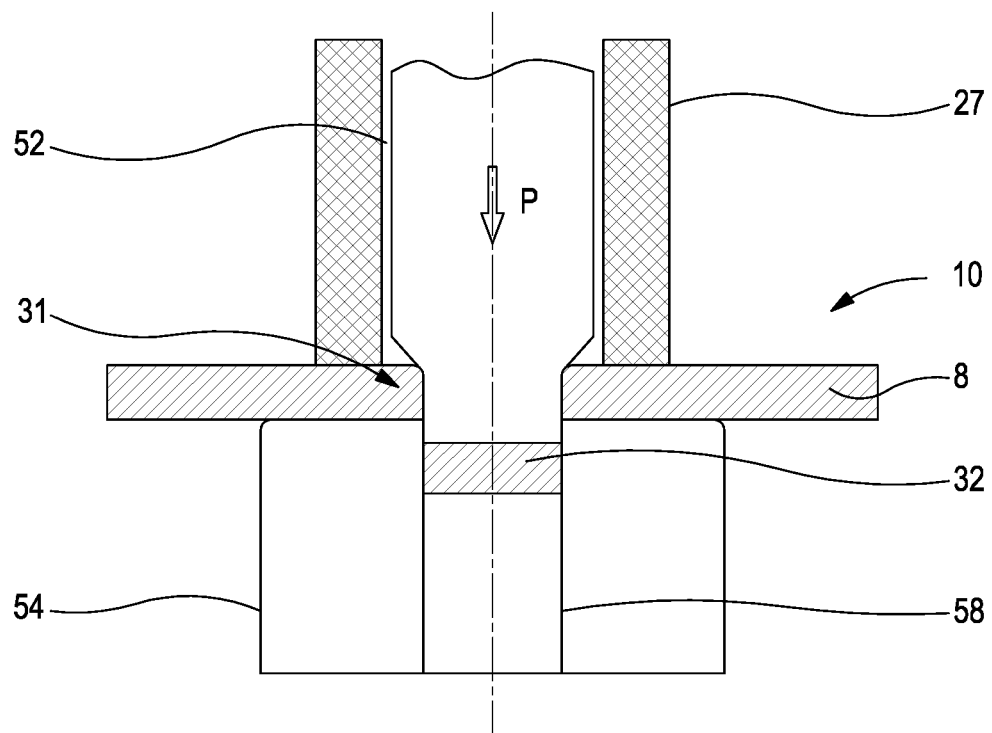

FIG. 7b shows a second step of the riveting process according to the seventh embodiment of the invention. In the second step, the punch 52 is driven into the upper layer 8 of the workpiece 6 under the action of punching force P. This results in the formation of detached portion 32 and an upper layer hole 31. The detached portion drops down the punch bore 58 for removal. In addition, the tapered portion 64 of the punch 52 contacts the an upper layer 8 of the workpiece 6 to create a countersunk or rounded impression on the edge of the upper layer 8 which joins the upper layer hole 31.

Figure 7C:
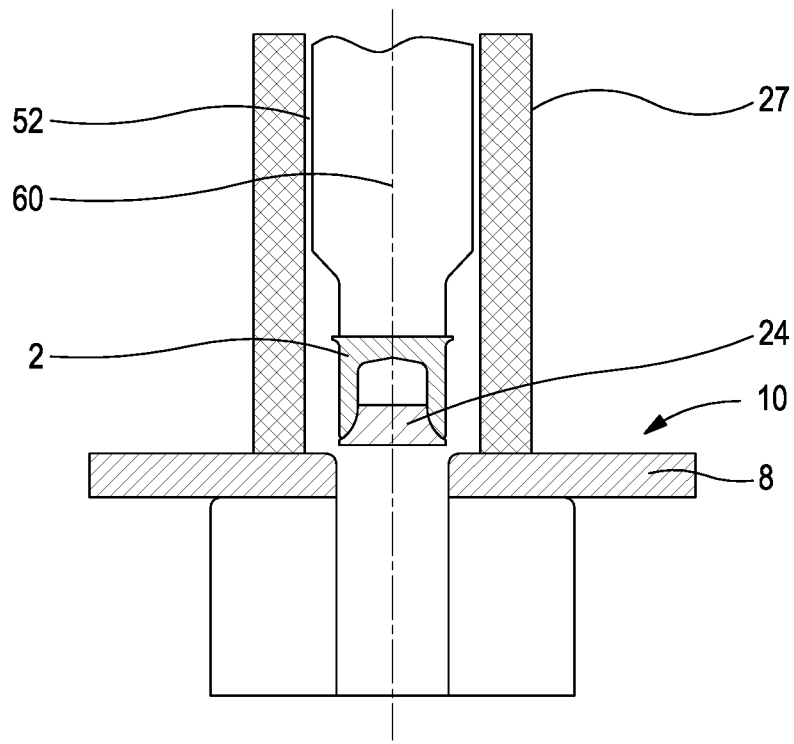

FIG. 7c shows a third step of the riveting process according to the seventh embodiment of the invention. In the third step, the punch 52 is retracted such that it is clear of the upper layer 8 of the workpiece 6 by a distance which is sufficient for the rivet 2 and insert 24 to be received therebetween. The rivet 2 and insert 24 are provided as a single assembly, such that the insert 24 is partially received within the interior of the rivet 2. The rivet and insert 24 are aligned with the punch axis 60 and are held in place by any suitable means, such as for example by an electromagnet, vacuum or the like.

Figure 7D:
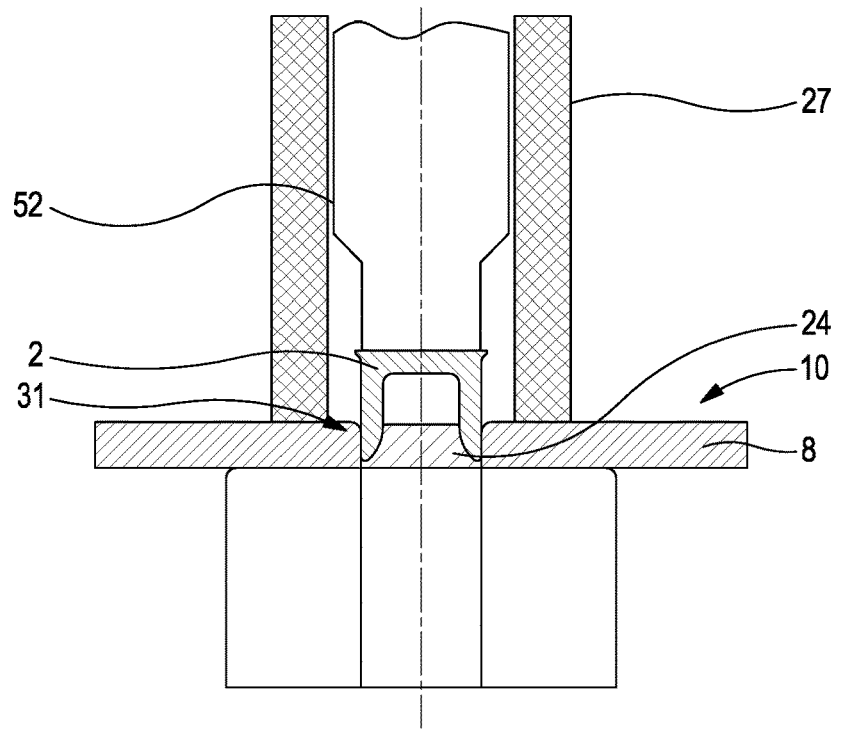

FIG. 7d shows a fourth step of the riveting process according to the seventh embodiment of the invention. In the fourth step, the punch 52 is lowered so that the rivet 2 and insert 24 are received in the upper layer hole 31 of the workpiece 6. In particular, the rivet 2 and insert 24 are aligned such that a lower surface of the insert 24 is flush with a lower surface of the upper layer 8 of the workpiece 6. The above notwithstanding, it will be appreciated that in alternative embodiments of the invention, the third and fourth steps above may be completed by hand, without the aid of the punch 52 (i.e. by simply inserting the rivet 2 and insert 24 into to upper layer hole 31 and transferring the upper layer 8 to the rivet setting apparatus 1).

Figure 7E:
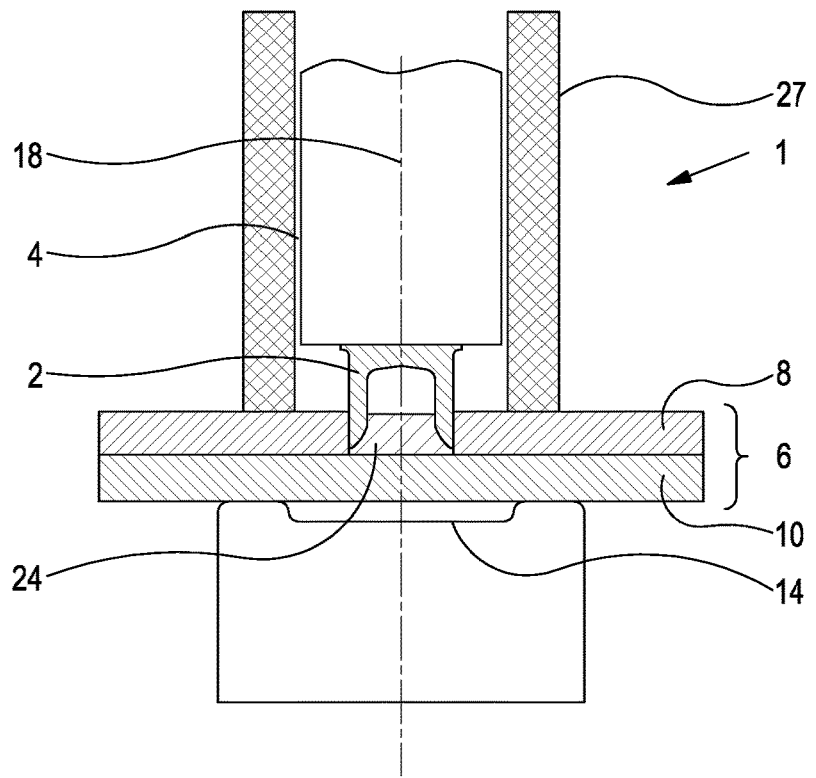

FIG. 7e shows a fifth step of the riveting process according to the seventh embodiment of the invention. In the fifth step the upper layer 8 having the rivet 2 and insert 24 assembled therewith is taken from the punching apparatus 56 and transferred to the rivet setting apparatus 1. The rivet setting apparatus 1 may, for example, be the same rivet setting apparatus described above in relation to the first embodiment of the invention. The upper layer 8 and lower layer 10 of the workpiece 6 are placed together and laid upon the die 12. Preferably, the rivet 2 and insert 24 are aligned with the central axis 18. However, in the embodiment shown in FIG. 7e, the punch 4 of the rivet setting apparatus 1 has a diameter which is larger than that of the rivet 2. As such, the punch 4 is able to account for a relatively large amount of misalignment between the central axis 18 and the rivet 2 and insert 24.

Figure 7F:
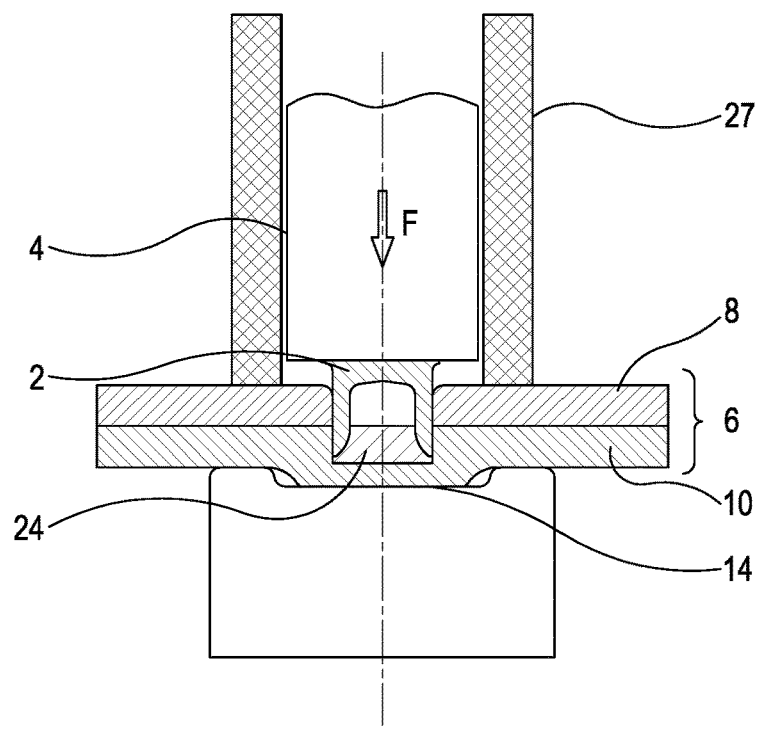

FIG. 7f shows a sixth step of the riveting process according to the seventh embodiment of the invention. In the sixth step, the punch 4 urges the rivet 2 and insert 24 against the lower layer 10 of the workpiece 6 under the action of force F. This causes the lower layer 10 to deform and contact the recessed surface 14 of the die 12.

Figure 7G:
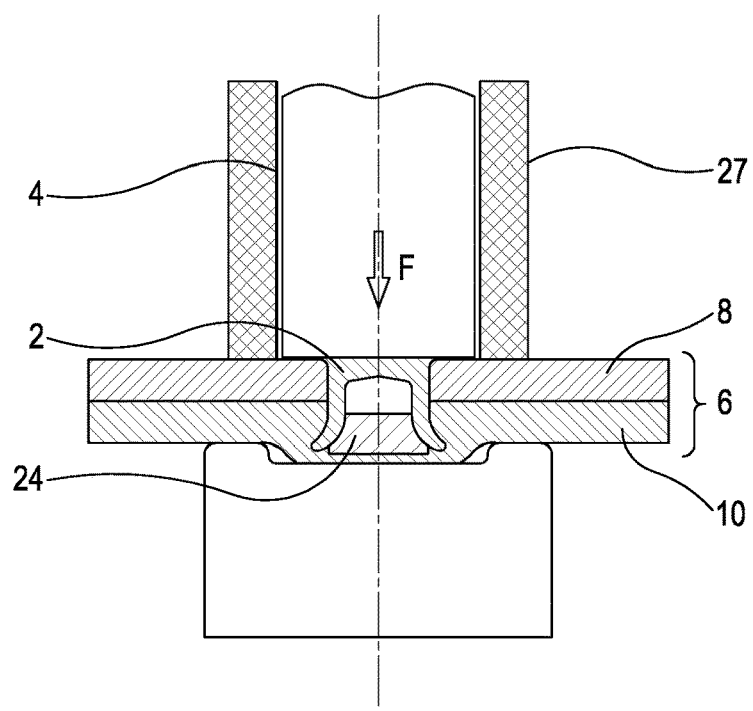

FIG. 7g shows a seventh step of the riveting process according to the seventh embodiment of the invention. In the seventh step, physical contact between the tapered rivet surface 25 and the tapered insert surface 30 causes the tip 23 of the rivet 2 to flare outwardly and interlock the workpiece 6 under continued application of the force F.

In the seventh embodiment, it will be appreciated that because the step of punching the upper layer hole 31 is completed before the upper layer 8 is presented to the rivet setting apparatus 1 for joining to the lower layer 10, It will be appreciated that the rivet 2 and insert 24 can be held captive within the upper layer hole 31 of the upper layer 8 before being presented to the rivet setting apparatus 1 for joining with the lower layer 10. As such, the rivet 2, insert 24 and upper layer 8 may be transported to a production line as a single piece, having been already partially processed thus saving time. That is to say, the initial steps of punching the upper layer hole 31 and receiving the rivet 2 and insert 24 within the hole can be completed away from the production line. This is particularly advantageous where the upper layer is made from an ultra-high strength material or is relatively thick and thus requires stronger machinery to punch the hole which is not ordinarily available on a typical production line.

It will be appreciated that in alternative embodiments, punch apparatus 56 need not be a different apparatus to the rivet setting apparatus 1, and may in fact be the same apparatus. However, in such embodiments the step of punching the upper layer hole 31 into the upper layer 8 of the workpiece 6 and receiving the rivet 2 and insert 24 therein may be completed in advance before the upper layer 8 is joined to the lower layer 10. For example, the upper layer 8 may require a plurality of upper layer holes 31 to be formed each of which receives rivet 2 and insert 24. The plurality of upper layer holes 31 can be completed in a batch and the rivets 2 and inserts 24 inserted therein before the upper layer 8 is joined to the lower layer 10, either on the same or a different machine.

In some embodiments the lowermost layer of the workpiece accommodates a slug of workpiece material. In other embodiments, a hole is cut fully through the workpiece, and a slug of workpiece material is not accommodated in the lowermost layer. Embodiments which do not accommodate a slug of workpiece material may have a workpiece with a thinner lowermost layer. The lowermost layer may for example have a thickness of at least 0.7 mm and may have a thickness of up to 2 mm) Embodiments which accommodate a slug of workpiece material may have a workpiece with a thicker lowermost layer. The lowermost layer may for example have a thickness 2 mm or more, and may for example have a thickness of up to 5 mm.

The uppermost layer of the workpiece may for example have a thickness of at least 0.7 mm. If the upper layer is formed from AHSS or UHSS it my for example have a thickness of up to 2 mm (it may be difficult to cut through thicker layers than this).

In general, an insert may be held in a rivet by friction, using adhesive, or in any other suitable manner. The rivet 2 may be provided with an anti-corrosion coating. The insert 24 may also be provided with the anti-corrosion coating (e.g. if the insert will be exposed after a joint has been formed). If the insert is held in the rivet without using adhesive, then the anti-corrosion coating may assist in providing adhesion between the rivet and the insert.

The uppermost layer thicknesses and lowermost layer mentioned above may be swapped for embodiments in which a stronger layer may be provided at the bottom of the workpiece (e.g. the third embodiment).

The invention claimed is:
1. A method of riveting comprising:
(i) providing a self-piercing rivet having a head and a shank depending downwardly therefrom, the shank terminating in a tip and being hollow so as to define a rivet interior;

(ii) providing an insert, the insert having a base and an insert shank that extends from the base, the insert shank comprising a blind bore;
(iii) receiving the insert at least partially within the rivet interior such that the blind bore faces an underside of the head of the self-piercing rivet;
(iv) placing the rivet and insert on an opposite side of a workpiece from a die;
(v) driving the rivet and the insert towards the die and into the workpiece under the action of a force using a punch along a central axis; and
(vi) reacting the force using the die so as to cause the blind bore of the insert shank to collapse to promote the tip of the rivet to flare outwardly and interlock the workpiece.

2. A method of riveting according to claim 1, wherein:
the insert comprises a tapered insert surface extending from the base of the insert, wherein the tapered insert surface varies in diameter relative to an insert axis, and
wherein the method comprises:
urging the rivet against the tapered insert surface so as to cause the tip of the rivet to flare outwardly and interlock the workpiece.

3. A method of riveting according to claim 1, wherein:
the insert shank configured to be received within the rivet interior, and
wherein the method comprises:
transferring the force from the punch to the workpiece through both the rivet and the insert shank.

4. A method of riveting according to claim 1, wherein the method further comprises punching a hole entirely through the workpiece using the rivet and the insert so as to form a detached portion of the workpiece, and receiving the rivet and insert within the hole.

5. A method of riveting according to claim 1, wherein:
the workpiece comprises at least two separate layers of material to be joined; and
wherein the method comprises before step (iv):
forming a hole in an upper layer of the workpiece.

6. A method of riveting according to claim 1, wherein the workpiece comprises an advanced high strength steel or an ultra-high strength steel.

7. A method of riveting according to claim 1, wherein the rivet is formed from a material with a hardness of up to 510 Hv.

8. A vehicle comprising a riveted joint formed using the method of claim 1.

9. A rivet assembly for inserting into a workpiece, the rivet assembly comprising:
a self-piercing rivet having a head and a shank depending downwardly from the head, the shank terminating in a tip and being hollow so as to define a rivet interior, wherein the shank defines a shank external diameter; and
an insert having a base and an insert shank that extends from the base, the insert shank comprising a blind bore that faces an underside of the head of the self-piercing rivet, wherein the insert is at least partially received within the rivet interior such that the base of the insert is located adjacent to the tip of the rivet, wherein the base defines a base diameter;
wherein the base diameter is greater than or equal to the shank external diameter; and
wherein the blind bore of the insert shank is configured, in use, to collapse to promote the tip of the rivet to flare radially outwardly and pierce the workpiece.

10. A rivet assembly according to claim 9, wherein the insert defines an insert axis, and the insert further comprises a tapered insert surface which varies in diameter relative to the insert axis.

11. A rivet assembly according to claim 9, wherein the rivet defines a rivet axis, and the rivet further comprises a tapered rivet surface which varies in diameter relative to the rivet axis.

12. A rivet assembly according to claim 9, wherein the insert shank is received within the rivet interior.

13. A rivet assembly according to claim 9, wherein the base of the insert extends beyond the tip of the rivet.

14. A rivet setting apparatus comprising: a rivet assembly including a self-piercing rivet having a head and a shank depending downwardly from the head, the shank terminating in a tip and being hollow so as to define a rivet interior; and an insert that is at least partially received within the rivet interior, the insert having a base and an insert shank that extends from the base, the insert shank comprising a blind bore that faces an underside of the head of the self-piercing rivet; a punch; and a die spaced apart from the punch along a central axis so that the rivet assembly and a workpiece may be received therebetween, wherein the punch is configured to drive the rivet assembly into the workpiece, wherein, in use, the rivet is driven under the action of a force from the punch, such that the die and insert react to the force causing the blind bore to collapse to promote the tip of the rivet to flare outwardly and interlock the workpiece.

15. A riveting apparatus according to claim 14, wherein the die comprises a bore and a push rod received within the bore, wherein the push rod is movable relative to the bore, the bore and the push rod defining a cavity which is open at a side of the die facing the punch, the push rod being configured to react against the force so as to cause the rivet to flare outwardly and interlock the workpiece.

16. A riveting apparatus according to claim 14, wherein the punch comprises a nose configured to punch a hole through an upper layer of the workpiece so as to leave a detached portion of the upper layer.

* * * * *